US012777499B2

(12) United States Patent
Fujishiro et al.

(10) Patent No.: US 12,777,499 B2
(45) Date of Patent: Oct. 27, 2026

(54) COMMUNICATION METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 317 days.

(21) Appl. No.: 18/431,737

(22) Filed: Feb. 2, 2024

(65) Prior Publication Data

US 2024/0179722 A1 May 30, 2024

Related U.S. Application Data

(63) Continuation of application No. PCT/JP2022/029552, filed on Aug. 1, 2022.

(60) Provisional application No. 63/228,268, filed on Aug. 2, 2021.

(51) Int. Cl.
*H04W 76/18* (2018.01)
*H04W 72/232* (2023.01)
*H04W 72/30* (2023.01)
*H04W 72/543* (2023.01)

(52) U.S. Cl.
CPC ......... *H04W 72/232* (2023.01); *H04W 72/30* (2023.01); *H04W 72/543* (2023.01)

(58) Field of Classification Search
None
See application file for complete search history.

(56) References Cited

U.S. PATENT DOCUMENTS 11,350,347 B2 5/2022 Yavuz et al.
2020/0260508 A1* 8/2020 He .......................... H04W 4/70
2023/0308221 A1* 9/2023 Kadiri ................... H04W 28/02
2024/0276519 A1* 8/2024 Lee ...................... H04B 7/0695

FOREIGN PATENT DOCUMENTS

JP 2020-502882 A 1/2020

OTHER PUBLICATIONS

Huawei, HiSilicon; "WID revision: NR Multicast and Broadcast Services"; 3GPP TSG RAN Meeting #88-e; RP-201038; E-meeting; Jun. 29-Jul. 3, 2020; pp. 1-6.
LG Electronics Inc.; "Discussion on RAN2 aspects of group scheduling and DRX"; 3GPP TSG-RAN2 #114e; R2-2106422; Electronic meeting; May 19-27, 2021; pp. 1-4.
Vivo; "[Pre114-e][002][MBS] Summary on MBS scheduling"; 3GPP TSG-RAN WG2 Meeting #114-electronic; R2-2106483; Online; May 19-27, 2021; pp. 1-11.

* cited by examiner

*Primary Examiner* — Anez C Ebrahim
(74) *Attorney, Agent, or Firm* — Studebaker Brackett PLLC

(57) ABSTRACT

A communication method according to a first aspect is a communication method used by a user equipment that performs reception processing of a physical downlink control channel (PDCCH) from a base station by using a radio network temporary identifier (RNTI) and includes, when N (N≥2) group RNTIs (G-RNTIs) are associated with one multicast broadcast service (MBS) session, specifying M (M≤N) G-RNTIs to be used for the reception processing from among the N G-RNTIs, and performing the reception processing by using the M G-RNTIs.

7 Claims, 27 Drawing Sheets

| | Delivery mode 1 | Delivery mode 2 |
|---|---|---|
| Intended for | Multicast sessions<br>(High QoS requirement) | Broadcast sessions<br>(Low QoS requirement) |
| Reception in | Connected | Connected<br>IDLE/INACTIVE |
| Configuration signalling by | RRC Reconfiguration | BCCH<br>MCCH |

| | Delivery mode 1 | Delivery mode 2 |
|---|---|---|
| Intended for | Multicast sessions<br><br>(High QoS requirement) | Broadcast sessions<br>FFS: Multicast sessions<br>(Low QoS requirement) |
| Data reception in | Connected<br>Deprioritized: IDLE/INACTIVE | ALL RRC states |
| Configuration reception in | Connected | All RRC states |
| Configuration signalling by | RRC Reconfiguration | BCCH and MCCH<br>Postpone: Dedicated MCCH (until RAN1 progress) |
| Notification by | RRC Reconfiguration<br>for Connected<br>due to session start<br>Group notification by PCCH<br>for IDLE/INACTIVE<br>due to session start<br>sent in all legacy PO w/ P-RNTI<br>with Session ID<br>FFS: PRACH capacity issue | MCCH change notification<br>due to session start<br>due to session modification<br>due to session stop<br>sent in first MCCH monitoring occasion of each MCCH repetition period (depends on RNTI)<br>FFS: Whether to be reused for modification of other information<br>FFS: Possibility of missing MCCH change notification |
| UE s interests informed by | 5GC (MBS session join/leave) | UE (MBS Interest Indication) |

FIG. 17

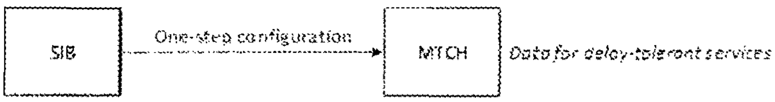

FIG. 18

| Information | Description |
|---|---|
| mbms-FreqList | "List of MBMS frequencies on which the UE is receiving or interested to receive MBMS via an MRB or SC-MRB." |
| mbms-Priority | "Indicates whether the UE prioritises MBMS reception above unicast reception. The field is present (i.e. value true), if the UE prioritises reception of all listed MBMS frequencies above reception of any of the unicast bearers. Otherwise the field is absent." |
| mbms-Services | The MBMS services that the UE is receiving or interested to receive via an SC MRB. |

FIG. 19

```
SystemInformationBlockType13-r9 ::= SEQUENCE {
  mbsfn-AreaInfoList-r9           MBSFN-AreaInfoList-r9,
  notificationConfig-r9           MBMS-
   NotificationConfig-r9,
  lateNonCriticalExtension        OCTET STRING
     OPTIONAL,
  ...,
  [[
  notificationConfig-v1430        MBMS-
   NotificationConfig-v1430    OPTIONAL
  ]],
  [[
  mbsfn-AreaInfoList-r16          MBSFN-AreaInfoList-r16
     OPTIONAL    --  Need OR
  ]]
}
```

FIG. 20

```
MBSFN-AreaInfoList-r9 ::=    SEQUENCE
   (SIZE(1..maxMBSFN-Area)) OF MBSFN-
   AreaInfo-r9

MBSFN-AreaInfo-r9 ::=        SEQUENCE {
  mbsfn-AreaId-r9            MBSFN-AreaId-r12,
  non-MBSFNregionLength        ENUMERATED {s1,
  s2},
  notificationIndicator-r9      INTEGER
  (0..7),
  mcch-Config-r9             SEQUENCE {
  mcch-RepetitionPeriod-r9   ENUMERATED
  {rf32, rf64, rf128, rf256},
  mcch-Offset-r9            INTEGER (0..10),
  mcch-ModificationPeriod-r9  ENUMERATED
  {rf512, rf1024},
  sf-AllocInfo-r9            BIT STRING
  (SIZE(6)),
  signallingMCS-r9           ENUMERATED {n2, n7,
  n13, n19}
  },
  ...,
  [[ mcch-Config-r14          SEQUENCE {
    mcch-RepetitionPeriod-v1430    ENUMERATED
  {rf1, rf2, rf4, rf8,
                rf16 }    OPTIONAL, -- Need
  OR
    mcch-ModificationPeriod-v1430 ENUMERATED
  {rf1, rf2, rf4, rf8, rf16, rf32, rf64,
  rf128,
                    rf256, spare7}
    OPTIONAL -- Need OR
  }                                    OPTIONAL,  -
  - Need OR
  subcarrierSpacingMBMS-r14    ENUMERATED
  {kHz7dot5, kHz1dot25}OPTIONAL -- Need OR
  ]]
}

MBSFN-AreaInfoList-r16 ::=   SEQUENCE
   (SIZE(1..maxMBSFN-Area)) OF MBSFN-
   AreaInfo-r16

MBSFN-AreaInfo-r16 ::=         SEQUENCE {
  mbsfn-AreaId-r16           MBSFN-AreaId-r12,
  notificationIndicator-r16     INTEGER
  (0..7),
  mcch-Config-r16              SEQUENCE {
  mcch-RepetitionPeriod-r16       ENUMERATED
  {rf1, rf2, rf4, rf8, rf16, rf32, rf64,
                              rf128, rf256, spare7,
  spare6, spare5,
                              spare4, spare3,
  spare2, spare1},
  mcch-ModificationPeriod-r16      ENUMERATED
  {rf1, rf2, rf4, rf8, rf16, rf32, rf64,
  rf128,
                              rf256, rf512, rf1024,
  spare5, spare4,
                              spare3,spare2,
  spare1},
  mcch-Offset-r16            INTEGER (0..10),
  sf-AllocInfo-r16           BIT STRING
  (SIZE(10)),
  signallingMCS-r16          ENUMERATED {n2, n7,
  n13, n19}
  },
  subcarrierSpacingMBMS-r16  ENUMERATED
  {kHz7dot5, kHz2dot5, kHz1dot25, kHz0dot37,
                spare4, spare3, spare2,
  spare1},
  timeSeparation-r16          ENUMERATED {s12,
  s14} OPTIONAL,-- Need OR
  ...
```

FIG. 21

```
MBMS-NotificationConfig-r9 ::=          SEQUENCE {
    notificationRepetitionCoeff-r9   ENUMERATED {n2, n4},
    notificationOffset-r9           INTEGER (0..10),
    notificationSF-Index-r9           INTEGER (1..6)
}

MBMS-NotificationConfig-v1430 ::=           SEQUENCE {
    notificationSF-Index-v1430          INTEGER (7..10)
}
```

FIG. 22

```
SystemInformationBlockType15-r11 ::=  SEQUENCE {
  mbms-SAI-IntraFreq-r11           MBMS-SAI-List-r11
        OPTIONAL, -- Need OR
  mbms-SAI-InterFreqList-r11          MBMS-SAI-
  InterFreqList-r11   OPTIONAL, -- Need OR
  lateNonCriticalExtension         OCTET STRING
     OPTIONAL,
  ...,
  [[ mbms-SAI-InterFreqList-v1140     MBMS-SAI-
  InterFreqList-v1140 OPTIONAL  -- Cond InterFreq
  ]],
  [[ mbms-IntraFreqCarrierType-r14    MBMS-CarrierType-
  r14        OPTIONAL, -- Need OR
  mbms-InterFreqCarrierTypeList-r14
                            MBMS-InterFreqCarrierTypeList-
  r14  OPTIONAL  -- Need OR
  ]]
}

MBMS-SAI-List-r11 ::=              SEQUENCE (SIZE
   (1..maxSAI-MBMS-r11)) OF MBMS-SAI-r11

MBMS-SAI-r11 ::=                 INTEGER (0..65535)

MBMS-SAI-InterFreqList-r11 ::=      SEQUENCE (SIZE
   (1..maxFreq)) OF MBMS-SAI-InterFreq-r11

MBMS-SAI-InterFreqList-v1140 ::=    SEQUENCE (SIZE
   (1..maxFreq)) OF MBMS-SAI-InterFreq-v1140

MBMS-SAI-InterFreq-r11 ::=          SEQUENCE {
  dl-CarrierFreq-r11                ARFCN-ValueEUTRA-r9,
  mbms-SAI-List-r11               MBMS-SAI-List-r11
}

MBMS-SAI-InterFreq-v1140 ::=        SEQUENCE {
  multiBandInfoList-r11           MultiBandInfoList-r11
        OPTIONAL  -- Need OR
}

MBMS-InterFreqCarrierTypeList-r14 ::= SEQUENCE (SIZE
   (1..maxFreq)) OF MBMS-CarrierType-r14

MBMS-CarrierType-r14 ::=           SEQUENCE {
  carrierType-r14                 ENUMERATED {mbms,
  fembmsMixed, fembmsDedicated},
  frameOffset-r14                 INTEGER (0..3)
     OPTIONAL  -- Need OR
}
```

FIG. 23

```
SystemInformationBlockType20-r13 ::=
    SEQUENCE {
  sc-mcch-RepetitionPeriod-r13     ENUMERATED
   {rf2, rf4, rf8, rf16, rf32, rf64, rf128,
   rf256},
  sc-mcch-Offset-r13                INTEGER (0..10),
  sc-mcch-FirstSubframe-r13    INTEGER (0..9),
  sc-mcch-duration-r13            INTEGER (2..9)
    OPTIONAL,
  sc-mcch-ModificationPeriod-r13 ENUMERATED
   {rf2, rf4, rf8, rf16, rf32, rf64, rf128,
   rf256,
                     rf512, rf1024, r2048, rf4096,
   rf8192, rf16384, rf32768,
                          rf65536},
  lateNonCriticalExtension         OCTET STRING
          OPTIONAL,
  ...,
  [[  br-BCCH-Config-r14               SEQUENCE {
    dummy                         ENUMERATED {rf1},
    dummy2                          ENUMERATED {rf1},
    mpdcch-Narrowband-SC-MCCH-r14      INTEGER
   (1..maxAvailNarrowBands-r13),
    mpdcch-NumRepetition-SC-MCCH-r14
    ENUMERATED {r1, r2, r4, r8, r16,
                                 r32, r64, r128,
   r256},
    mpdcch-StartSF-SC-MCCH-r14        CHOICE {
      fdd-r14                       ENUMERATED {v1,
   v1dot5, v2, v2dot5, v4,
                                   v5, v8, v10},
      tdd-r14                       ENUMERATED {v1, v2,
   v4, v5, v8, v10, v20}
    },
    mpdcch-PDSCH-HoppingConfig-SC-MCCH-r14
    ENUMERATED {off, ce-ModeA, ce-ModeB},
    sc-mcch-CarrierFreq-r14           ARFCN-
   ValueEUTRA-r9,
    sc-mcch-Offset-BR-r14             INTEGER
   (0..10),
    sc-mcch-RepetitionPeriod-BR-r14
    ENUMERATED {rf32, rf128, rf512, rf1024,
                          rf2048, rf4096, rf8192,
   rf16384},
    sc-mcch-ModificationPeriod-BR-r14
    ENUMERATED { rf32, rf128, rf256, rf512,
   rf1024,
                          rf2048, rf4096, rf8192,
   rf16384, rf32768,
                          rf65536, rf131072,
   rf262144, rf524288,
                          rf1048576}
   }                                      OPTIONAL, --
   - Need OR
   sc-mcch-SchedulingInfo-r14          SC-MCCH-
   SchedulingInfo-r14      OPTIONAL,  -- Need OP
   pdsch-maxNumRepetitionCEmodeA-SC-MTCH-r14
                         ENUMERATED { r16, r32 }
    OPTIONAL,  -- Need OR
   pdsch-maxNumRepetitionCEmodeB-SC-MTCH-r14
                         ENUMERATED {
                           r192, r256, r384, r512,
   r768, r1024,
                           r1536, r2048}
    OPTIONAL -- Need OR
   ]],
   [[  sc-mcch-RepetitionPeriod-v1470
    ENUMERATED {rf1}          OPTIONAL,  -- Need
   OR
   sc-mcch-ModificationPeriod-v1470
    ENUMERATED {rf1}          OPTIONAL -- Need OR
   ]]
}

SC-MCCH-SchedulingInfo-r14::= SEQUENCE {
   onDurationTimerSCPTM-r14          ENUMERATED
    {psf10, psf20, psf100, psf300,
                          psf500, psf1000, psf1200,
   psf1600},
   drx-InactivityTimerSCPTM-r14    ENUMERATED
    {psf0, psf1, psf2, psf4, psf8, psf16,
                          psf32, psf64, psf128,
   psf256, ps512,
                          psf1024, psf2048,
   psf4096, psf8192, psf16384},
   schedulingPeriodStartOffsetSCPTM-r14
     CHOICE {
   sf10                        INTEGER(0..9),
   sf20                        INTEGER(0..19),
   sf32                        INTEGER(0..31),
   sf40                        INTEGER(0..39),
   sf64                        INTEGER(0..63),
   sf80                        INTEGER(0..79),
   sf128                       INTEGER(0..127),
   sf160                       INTEGER(0..159),
   sf256                       INTEGER(0..255),
   sf320                       INTEGER(0..319),
   sf512                       INTEGER(0..511),
   sf640                       INTEGER(0..639),
   sf1024                        INTEGER(0..1023),
   sf2048                        INTEGER(0..2047),
   sf4096                        INTEGER(0..4095),
   sf8192                        INTEGER(0..8191)
   },
   ...
```

FIG. 24

```
SCPTMConfiguration-r13 ::=     SEQUENCE {
   sc-mtch-InfoList-r13      SC-MTCH-InfoList-r13,
   scptm-NeighbourCellList-r13    SCPTM-
   NeighbourCellList-r13       OPTIONAL, -- Need OP
   lateNonCriticalExtension     OCTET STRING
      OPTIONAL,
   nonCriticalExtension      SCPTMConfiguration-v1340
      OPTIONAL
}

SCPTMConfiguration-v1340 ::= SEQUENCE {
   p-b-r13                   INTEGER (0..3)
      OPTIONAL, -- Need ON
   nonCriticalExtension        SEQUENCE {}
      OPTIONAL
}
```

FIG. 25

```
SC-MTCH-InfoList-r13 ::=       SEQUENCE (SIZE (0..maxSC-
   MTCH-r13)) OF SC-MTCH-Info-r13

SC-MTCH-Info-r13 ::=         SEQUENCE  {
   mbmsSessionInfo-r13              MBMSSessionInfo-r13,
   g-RNTI-r13                    BIT STRING(SIZE(16)),
   sc-mtch-schedulingInfo-r13        SC-MTCH-
   SchedulingInfo-r13         OPTIONAL, -- Need OP
   sc-mtch-neighbourCell-r13        BIT STRING
   (SIZE(maxNeighCell-SCPTM-r13))   OPTIONAL, -- Need OP
   ...,
   [[ p-a-r13                    ENUMERATED {
                             dB-6, dB-4dot77, dB-3, dB-
   1dot77,
                             dB0, dB1, dB2, dB3}
     OPTIONAL   -- Need ON
   ]]
}

MBMSSessionInfo-r13 ::=          SEQUENCE  {
   tmgi-r13                      TMGI-r9,
   sessionId-r13                   OCTET STRING (SIZE (1))
        OPTIONAL  -- Need OR
}

SC-MTCH-SchedulingInfo-r13::=    SEQUENCE  {
   onDurationTimerSCPTM-r13          ENUMERATED {
                             psf1, psf2, psf3, psf4,
   psf5, psf6,
                             psf8, psf10, psf20, psf30,
   psf40,
                             psf50, psf60, psf80, psf100,
                             psf200},
   drx-InactivityTimerSCPTM-r13        ENUMERATED {
                             psf0, psf1, psf2, psf4,
   psf8,
                             psf10, psf20, psf40,
                             psf80, psf160, ps320,
                             psf640, psf960,
                             psf1280, psf1920, psf2560},
   schedulingPeriodStartOffsetSCPTM-r13  CHOICE {
   sf10                      INTEGER(0..9),
   sf20                      INTEGER(0..19),
   sf32                      INTEGER(0..31),
   sf40                      INTEGER(0..39),
   sf64                      INTEGER(0..63),
   sf80                      INTEGER(0..79),
   sf128                        INTEGER(0..127),
   sf160                        INTEGER(0..159),
   sf256                        INTEGER(0..255),
   sf320                        INTEGER(0..319),
   sf512                        INTEGER(0..511),
   sf640                        INTEGER(0..639),
   sf1024                       INTEGER(0..1023),
   sf2048                       INTEGER(0..2048),
   sf4096                       INTEGER(0..4096),
   sf8192                       INTEGER(0..8192)
   },
```

FIG. 26

```
SCPTM-NeighbourCellList-r13 ::=     SEQUENCE (SIZE
   (1..maxNeighCell-SCPTM-r13)) OF PCI-ARFCN-r13

PCI-ARFCN-r13 ::=              SEQUENCE {
   physCellId-r13                 PhysCellId,
   carrierFreq-r13                   ARFCN-ValueEUTRA-r9
     OPTIONAL
}
```

FIG. 27

```
MBMSInterestIndication-r11 ::= SEQUENCE {
  criticalExtensions            CHOICE {
   c1                    CHOICE {
     interestIndication-r11
     MBMSInterestIndication-r11-IEs,
     spare3 NULL, spare2 NULL, spare1 NULL
   },
   criticalExtensionsFuture        SEQUENCE {}
   }
}

MBMSInterestIndication-r11-IEs ::= SEQUENCE
   {
  mbms-FreqList-r11
    CarrierFreqListMBMS-r11       OPTIONAL,
  mbms-Priority-r11             ENUMERATED {true}
            OPTIONAL,
  lateNonCriticalExtension       OCTET STRING
            OPTIONAL,
  nonCriticalExtension
    MBMSInterestIndication-v1310-IEsOPTIONAL
}

MBMSInterestIndication-v1310-IEs ::=
    SEQUENCE {
  mbms-Services-r13            MBMS-ServiceList-
   r13       OPTIONAL,
  nonCriticalExtension
    MBMSInterestIndication-v1540-IEs
    OPTIONAL
}

MBMSInterestIndication-v1540-IEs ::=
   SEQUENCE {
  mbms-ROM-InfoList-r15      SEQUENCE
   (SIZE(1..maxMBMS-ServiceListPerUE-r13)) OF
  MBMS-ROM-Info-r15
        OPTIONAL,
  nonCriticalExtension
    MBMSInterestIndication-v1610-IEsOPTIONAL
}

MBMSInterestIndication-v1610-IEs ::=
    SEQUENCE {
  mbms-ROM-InfoList-r16        SEQUENCE
   (SIZE(1..maxMBMS-ServiceListPerUE-r13)) OF
  MBMS-ROM-Info-r16   OPTIONAL,
  nonCriticalExtension          SEQUENCE {}
           OPTIONAL
}

MBMS-ROM-Info-r15 ::= SEQUENCE {
  mbms-ROM-Freq-r15             ARFCN-
  ValueEUTRA-r9,
  mbms-ROM-SubcarrierSpacing-r15   ENUMERATED
   {kHz15, kHz7dot5, kHz1dot25},
  mbms-Bandwidth-r15            ENUMERATED {n6,
   n15, n25, n50, n75, n100}
}

MBMS-ROM-Info-r16 ::= SEQUENCE {
  mbms-ROM-Freq-r16            ARFCN-ValueEUTRA-
   r9,
  mbms-ROM-SubcarrierSpacing-r16   ENUMERATED
   {kHz2dot5, kHz0dot37},
  mbms-Bandwidth-r16            ENUMERATED {n6,
   n15, n25, n50, n75, n100}
```

FIG. 28

```
CarrierFreqListMBMS-r11 ::=   SEQUENCE (SIZE
   (1..maxFreqMBMS-r11)) OF ARFCN-ValueEUTRA-r9
```

FIG. 29

```
MBMS-ServiceList-r13 ::=        SEQUENCE (SIZE
    (0..maxMBMS-ServiceListPerUE-r13)) OF MBMS-
    ServiceInfo-r13

MBMS-ServiceInfo-r13 ::=           SEQUENCE   {
   tmgi-r13                     TMGI-r9
}
```

FIG. 30

5.2.4.1 Reselection priorities handling

[...]

NOTE 1: The prioritization among the frequencies which UE considers to be the highest priority frequency is left to UE implementation.

[...]

If the UE is capable either of MBMS Service Continuity or of SC-PTM reception and is receiving or interested to receive an MBMS service and can only receive this MBMS service while camping on a frequency on which it is provided, the UE may consider that frequency to be the highest priority during the MBMS session TS 36.300 [2] as long as the two following conditions are fulfilled:

1) Either:

- the UE is capable of MBMS service continuity and the reselected cell is broadcasting SIB13; or
- the UE is capable of SC-PTM reception and the reselected cell is broadcasting SIB20;

2) Either:

- SIB15 of the serving cell indicates for that frequency one or more MBMS SAIs included and associated with that frequency in the MBMS User Service Description (USD) TS 26.346 [22] of this service; or
- SIB15 is not broadcast in the serving cell and that frequency is included in the USD of this service.

If the UE is capable either of MBMS Service Continuity or of SC-PTM reception and is receiving or interested to receive an MBMS service provided on a downlink only MBMS frequency, on a frequency used by dedicated MBMS cells, on a frequency used by FeMBMS/Unicast-mixed cells as defined in TS 36.300 [2], or on a frequency belonging to PLMN different from its registered PLMN, the UE may consider cell reselection candidate frequencies at which it can not receive the MBMS service to be of the lowest priority during the MBMS session TS 36.300 [2], as long as the above mentioned condition 1) is fulfilled for the cell on the MBMS frequency which the UE monitors or this cell broadcasts SIB1-MBMS and as long as the above mentioned condition 2) is fulfilled for the serving cell.

NOTE 2: Example scenarios in which the previous down-prioritisation may be needed concerns the cases where camping is not possible, while the UE can only receive this MBMS frequency when camping on a subset of cell reselection candidate frequencies, e.g. the MBMS frequency is a downlink only carrier, the MBMS frequency is used by dedicated MBMS cells, the MBMS frequency is used by FeMBMS/Unicast-mixed cells TS 36.300 [2], or the MBMS frequency belongs to a PLMN different from UE's registered PLMN.

If the UE is not capable of MBMS Service Continuity but has knowledge on which frequency an MBMS service of interest is provided, it may consider that frequency to be the highest priority during the MBMS session TS 36.300 [2] as long as the reselected cell is broadcasting SIB13.

If the UE is not capable of MBMS Service Continuity but has knowledge on which downlink only frequency, on which frequency used by dedicated MBMS cells, on which frequency used by FeMBMS/Unicast-mixed cells as defined in TS 36.300 [2] or on which frequency belonging to PLMN different from its registered PLMN an MBMS service of interest is provided, it may consider cell reselection candidate frequencies at which it can not receive the MBMS service to be of the lowest priority during the MBMS session TS 36.300 [2] as long as the cell on the MBMS frequency which the UE monitors is broadcasting SIB13 or SIB1-MBMS.

NOTE 3: The UE considers that the MBMS session is ongoing using the session start and end times as provided by upper layers in the USD i.e. the UE does not verify if the session is indicated on MCCH.

[...]

FIG. 31

5.2.4.6 Intra-frequency and equal priority inter-frequency Cell Reselection criteria The cell -ranking criterion $R_s$ for serving cell and $R_n$ for neighbouring cells is defined by:

$$R_s = Q_{meas,s} + Q_{Hyst} - Qoffset_{temp} + Qoffset_{SCPTM}$$
$$R_n = Q_{meas,n} - Qoffset - Qoffset_{temp} + Qoffset_{SCPTM}$$

where:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero.<br>For inter-frequency:<br>Except for NB-IoT, equals to $Qoffset_{s,n}$ plus $Qoffset_{frequency}$, if $Qoffset_{s,n}$ is valid, otherwise this equals to $Qoffset_{frequency}$.<br>For NB-IoT equals to $QoffsetDedicated_{frequency}$ for any frequency other than the frequency of the dedicated frequency offset, if $QoffsetDedicated_{frequency}$ is valid, otherwise this equals to $Qoffset_{frequency}$ (if $QoffsetDedicated_{frequency}$ is valid $Qoffset_{frequency}$ is not used). |
| $Qoffset_{temp}$ | Offset temporarily applied to a cell as specified in TS 36.331 [3] |
| $Qoffset_{SCPTM}$ | Offset temporarily applied to an SC-PTM frequency as specified below. The offset is applied to all cells on the SC-PTM frequency. If $Qoffset_{SCPTM}$ is valid, Qoffset for inter-frequency neighbour cells is not used. |

If the NB -IoT UE or UE in enhanced coverage is capable of SC -PTM reception and is receiving or interested to receive an MBMS service and can only receive this MBMS service while camping on a frequency on which it is provided (SC - PTM frequency), the UE cons iders $Qoffset_{SCPTM}$ to be valid during the MBMS session TS 36.300 [2] as long as the following condition is fulfilled:

Either:

- SIB15 (or SIB15-NB) of the serving cell indicates for that frequency one or more MBMS SAIs included in the MBMS User Service Description (USD) TS 26.346 [22] of this service; or
- SIB15 (or SIB15-NB) is not broadcast in the serving cell and that frequency is included in the USD of this service.

NOTE: UE should search for a higher ranked cell on another frequency for cell reselection as soon as possible after the UE stops using $Qoffset_{SCPTM}$.

[...]

FIG. 32

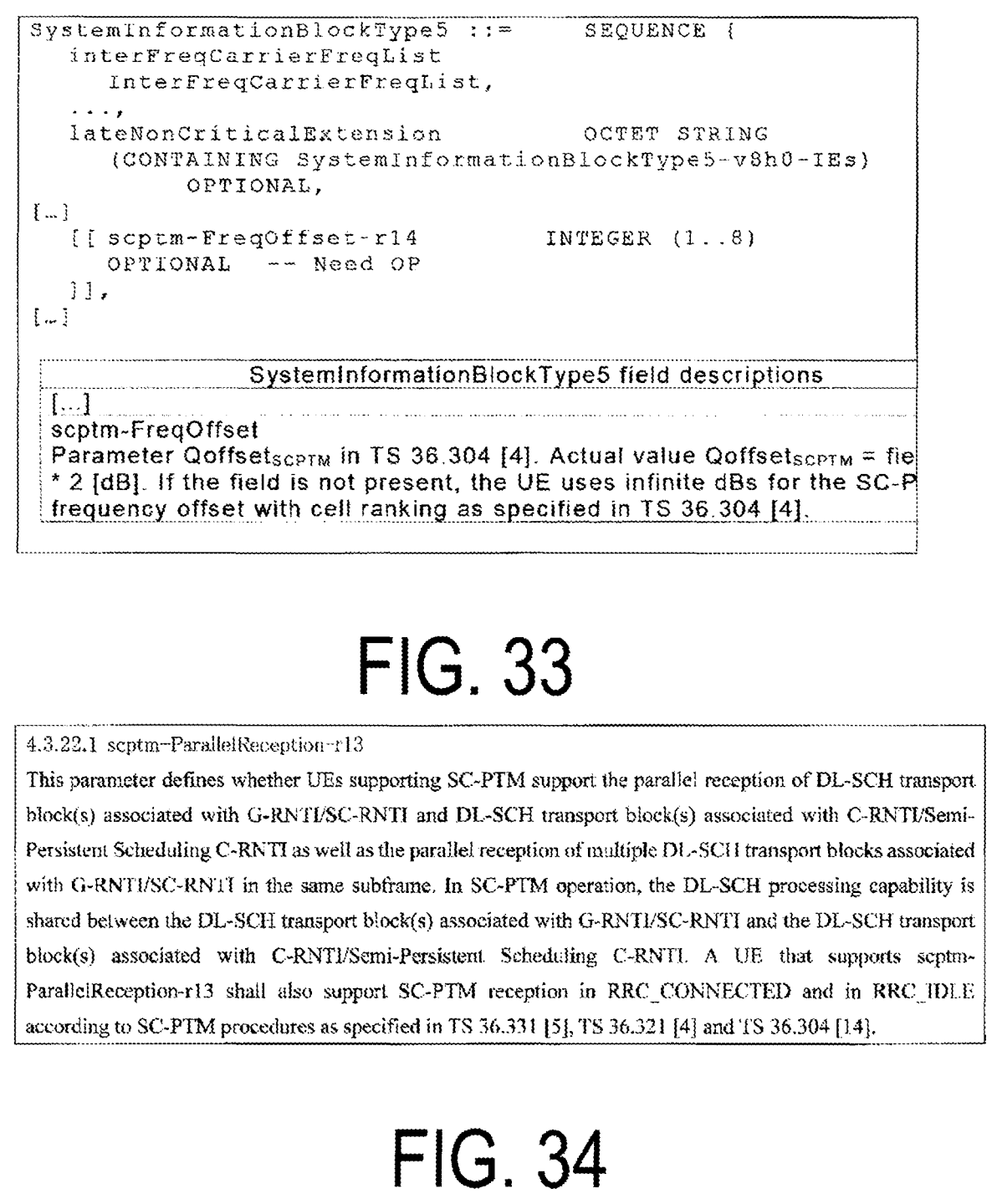

```
SystemInformationBlockType5 ::=     SEQUENCE {
   interFreqCarrierFreqList
      InterFreqCarrierFreqList,
   ...,
   lateNonCriticalExtension          OCTET STRING
      (CONTAINING SystemInformationBlockType5-v8h0-IEs)
         OPTIONAL,
[...]
   [[ scptm-FreqOffset-r14        INTEGER (1..8)
      OPTIONAL   -- Need OP
   ]],
[...]
```

| SystemInformationBlockType5 field descriptions |
|---|
| [...] |
| scptm-FreqOffset<br>Parameter $Qoffset_{SCPTM}$ in TS 36.304 [4]. Actual value $Qoffset_{SCPTM}$ = fie * 2 [dB]. If the field is not present, the UE uses infinite dBs for the SC-P frequency offset with cell ranking as specified in TS 36.304 [4]. |

FIG. 33

4.3.22.1 scptm-ParallelReception-r13

This parameter defines whether UEs supporting SC-PTM support the parallel reception of DL-SCH transport block(s) associated with G-RNTI/SC-RNTI and DL-SCH transport block(s) associated with C-RNTI/Semi-Persistent Scheduling C-RNTI as well as the parallel reception of multiple DL-SCH transport blocks associated with G-RNTI/SC-RNTI in the same subframe. In SC-PTM operation, the DL-SCH processing capability is shared between the DL-SCH transport block(s) associated with G-RNTI/SC-RNTI and the DL-SCH transport block(s) associated with C-RNTI/Semi-Persistent Scheduling C-RNTI. A UE that supports scptm-ParallelReception-r13 shall also support SC-PTM reception in RRC_CONNECTED and in RRC_IDLE according to SC-PTM procedures as specified in TS 36.331 [5], TS 36.321 [4] and TS 36.304 [14].

FIG. 34

| Parameters | Descriptions [9] | Need or not |
|---|---|---|
| drx-onDurationTimer | The duration at the beginning of a DRX cycle. | Needed |
| drx-SlotOffset | The delay before starting the drx-onDurationTimer | Needed |
| drx-InactivityTimer | The duration after the PDCCH occasion in which a PDCCH indicates a new UL or DL transmission for the MAC entity. | Needed |
| drx-RetransmissionTimerDL | The maximum duration until a DL retransmission is received. | Needed |
| drx-RetransmissionTimerUL | The maximum duration until a grant for UL retransmission is received. | Not needed |
| drx-LongCycleStartOffset | The Long DRX cycle and drx-StartOffset which defines the subframe where the Long and Short DRX cycle starts. | Needed |
| drx-ShortCycle | The Short DRX cycle. | Not needed |
| drx-ShortCycleTimer | The duration the UE shall follow the Short DRX cycle | Not needed |
| drx-HARQ-RTT-TimerDL | The minimum duration before a DL assignment for HARQ retransmission is expected by the MAC entity. | Needed |
| drx-HARQ-RTT-TimerUL | The minimum duration before a UL HARQ retransmission grant is expected by the MAC entity. | Not needed |

FIG. 35

| Parameters | Descriptions [12] | Need or not |
|---|---|---|
| onDurationTimerSCPTM | Indicates the duration in subframes during which SC-MCCH may be scheduled in MPDCCH sub-frames. | Needed |
| drx-InactivityTimerSCPTM | Timer for listening to SC-MCCH scheduling. | Needed |
| schedulingPeriodStartOffsetSCPTM | SCPTM-SchedulingCycle and SCPTM-SchedulingOffset in TS 36.321. | Needed |

FIG. 36

COMMUNICATION METHOD

RELATED APPLICATIONS

The present application is a continuation based on PCT Application No. PCT/JP2022/029552, filed on Aug. 1, 2022, which claims the benefit of U.S. Provisional Patent Application No. 63/228,268 filed on Aug. 2, 2021. The content of which is incorporated by reference herein in their entirety.

TECHNICAL FIELD

The present disclosure relates to a communication method used in a mobile communication system.

BACKGROUND OF INVENTION

The 3rd Generation Partnership Project (3GPP) standard has defined the technical specifications of NR (New Radio) positioned as the 5th generation (5G) radio access technology. NR has features such as high speed, large capacity, high reliability, and low latency compared to Long Term Evolution (LTE), which is a 4th-generation (4G) radio access technology. In the 3GPP, there is a discussion to formulate technical specifications of 5G/NR multicast broadcast service (MBS) (for example, see Non-Patent Document 1).

CITATION LIST

Non-Patent Literature

Non-Patent Document 1: 3GPP Contribution: RP-201038, "WID revision: NR Multicast and Broadcast Services"

SUMMARY

A communication method according to a first aspect is a communication method used by a user equipment that performs reception processing of a physical downlink control channel (PDCCH) from a base station by using a radio network temporary identifier (RNTI) and includes, when N (N≥2) group RNTIs (G-RNTIs) are associated with one multicast broadcast service (MBS) session, specifying M (M≤N) G-RNTIs to be used for the reception processing from among the N G-RNTIs, and performing the reception processing by using the M G-RNTIs.

A communication method according to a second aspect is a communication method used by a user equipment that performs reception processing of a physical downlink control channel (PDCCH) from a base station by using a radio network temporary identifier (RNTI) and includes performing the reception processing to receive a dedicated traffic channel (DTCH) by using a cell RNTI (C-RNTI), performing the reception processing to receive a multicast traffic channel (MTCH) by using a group RNTI (G-RNTI), and when an identical logical channel identifier (LCID) is allocated to the DTCH and the MTCH, specifying a logical channel to which received data obtained in response to the reception processing belongs, based on the RNTI used in the reception processing.

A communication method according to a third aspect is a communication method used in a mobile communication system and includes transmitting, at a base station, configuration information used for reception of a multicast traffic channel (MTCH) on a multicast control channel (MCCH), and transmitting, at the base station, a notification regarding modification of a content of the MCCH to a user equipment on a physical downlink control channel (PDCCH) at a predetermined timing. When the modification is not present, the transmitting includes transmitting the notification indicating that the modification is not present.

BRIEF DESCRIPTION OF THE DRAWINGS

FIG. 17 is a diagram illustrating an overview of an aspect of a stage 2 control plane in a delivery mode.

FIG. 18 is a diagram illustrating a one-step setting of delivery mode 2.

FIG. 19 is a diagram illustrating MBMS interest indication (excluding a ROM-related setting) in LTE.

FIG. 20 is a diagram showing the content of SIB13 of LTE.

FIG. 21 is a diagram showing the content of SIB13 of LTE.

FIG. 22 is a diagram showing the content of SIB13 of LTE.

FIG. 23 is a diagram showing the content of SIB15 of LTE.

FIG. 24 is a diagram showing the content of SIB20 of LTE.

FIG. 25 is a diagram showing the content of SC-MCCH of LTE.

FIG. 26 is a diagram showing the content of SC-MCCH of LTE.

FIG. 27 is a diagram showing the content of SC-MCCH of LTE.

FIG. 28 is a diagram showing the content of MBMS interest indication in LTE.

FIG. 29 is a diagram showing the content of MBMS interest indication in LTE.

FIG. 30 is a diagram showing the content of MBMS interest indication in LTE.

FIG. 31 is a diagram showing priorities of cell reselection of an eMBMS frequency in LTE.

FIG. 32 is a diagram showing priorities of cell levels in intra-frequency and intra-frequency cell reselection with an equal priority in NB-IOT in a CE (including eMTC) and in LTE for UE.

FIG. 33 is a diagram illustrating an example in which a QoffsetSCPTM is set as an SCPTM frequency offset in SIB5.

FIG. 34 is a diagram illustrating UE capability scptm-ParallelReception-r13 in LTE SC-PTM.

FIG. 35 is a diagram illustrating DRX parameters for PTM transmission via delivery mode 1.

FIG. 36 is a diagram illustrating DRX parameters for PTM transmission via delivery mode 2.

DESCRIPTION OF EMBODIMENTS

5G/NR multicast broadcast services are desired to provide enhanced services compared to 4G/LTE multicast broadcast services.

In view of this, the present disclosure provides a communication method for implementing enhanced multicast broadcast services.

A mobile communication system according to an embodiment is described with reference to the drawings. In the description of the drawings, the same or similar parts are denoted by the same or similar reference signs.

First Embodiment

Configuration of Mobile Communication System

Figure 1:
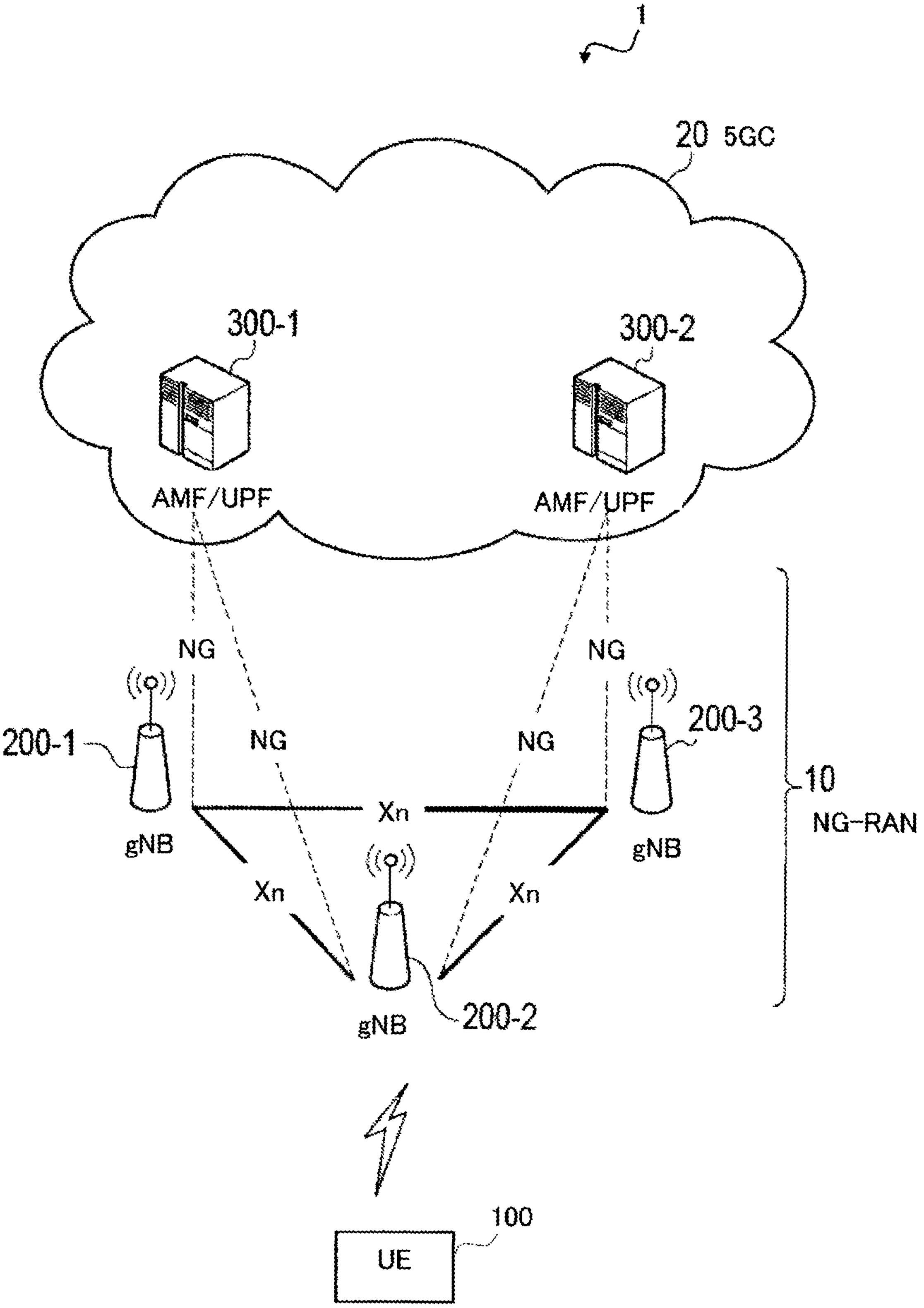
FIG. 1 is a diagram illustrating a configuration of a mobile communication system according to a first embodiment.

FIG. 1 is a diagram illustrating a configuration of a mobile communication system according to a first embodiment. A mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a user equipment (UE) 100, a 5G radio access network (Next Generation Radio Access Network (NG-RAN)) 10, and a 5G Core Network (5GC) 20. Hereinafter, the NG-RAN 10 is simply referred to as a "RAN 10". The 5GC 20 may be simply referred to as a core network (CN) 20.

The UE 100 is a mobile wireless communication apparatus. The UE 100 may be any apparatus as long as the UE 100 is used by a user. Examples of the UE 100 include a mobile phone terminal (including a smartphone), and/or a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes a base station (referred to as a "gNB" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency (also simply referred to as a "frequency").

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface which is an interface between a base station and the core network.

Figure 2:
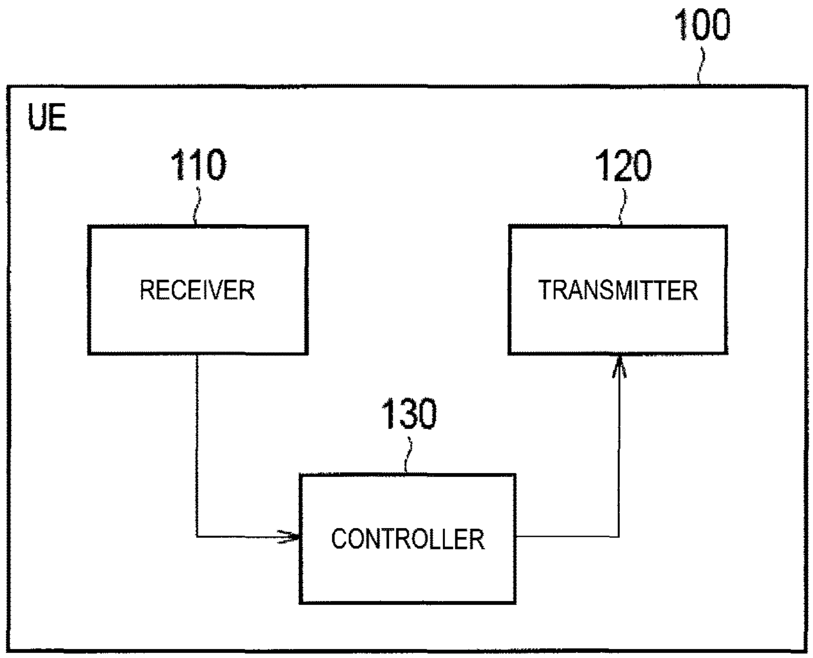
FIG. 2 is a diagram illustrating a configuration of a user equipment (UE) according to the first embodiment.

FIG. 2 is a diagram illustrating a configuration of the UE 100 (user equipment) according to the first embodiment. The UE 100 includes a receiver 110, a transmitter 120, and a controller 130. The receiver 110 and the transmitter 120 constitute a wireless communication section that performs wireless communication with the gNB 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of controls and processing operations in the UE 100. Such processing includes processing of each layer to be described below. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing operations.

Figure 3:
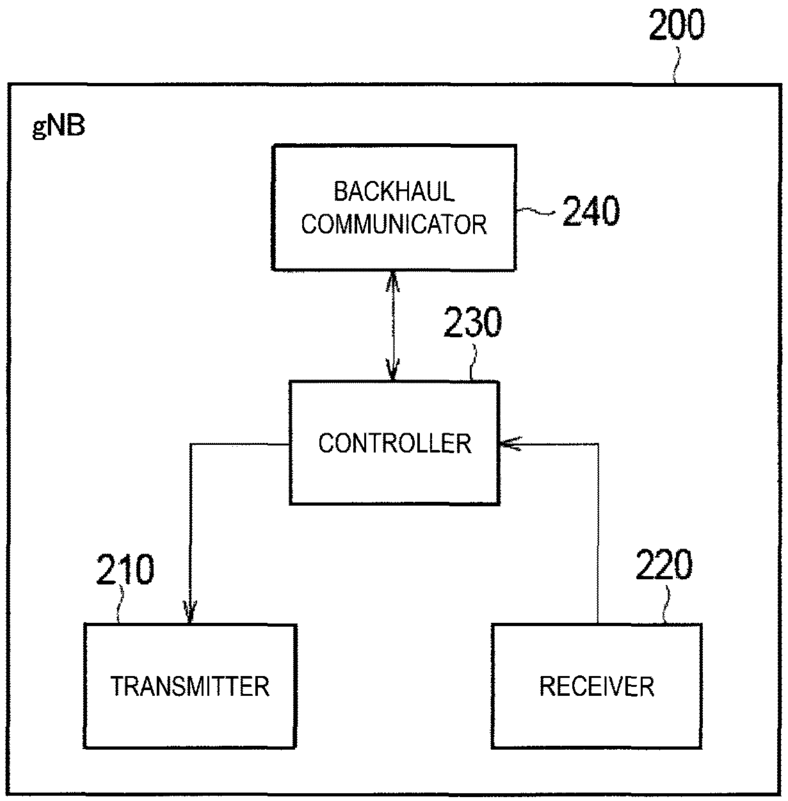
FIG. 3 is a diagram illustrating a configuration of a gNB (base station) according to the first embodiment.

FIG. 3 is a diagram illustrating a configuration of the gNB 200 (base station) according to the first embodiment. The gNB 200 includes a transmitter 210, a receiver 220, a controller 230, and a backhaul communicator 240. The transmitter 210 and the receiver 220 constitute a wireless communication section that performs wireless communication with the UE 100. The backhaul communicator 240 constitutes a network communication section that performs communication with the CN 20.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls and processing operations in the gNB 200. Such processing includes processing of each layer to be described below. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing operations.

The backhaul communicator 240 is connected to a neighboring base station via an Xn interface that is an inter-base station interface. The backhaul communicator 240 is connected to the AMF/UPF 300 via an NG interface that is an interface between a base station and the core network. Note that the gNB 200 may include a Central Unit (CU) and a Distributed Unit (DU) (i.e., divided functions), and the both units may be connected via an F1 interface that is a fronthaul interface.

Figure 4:
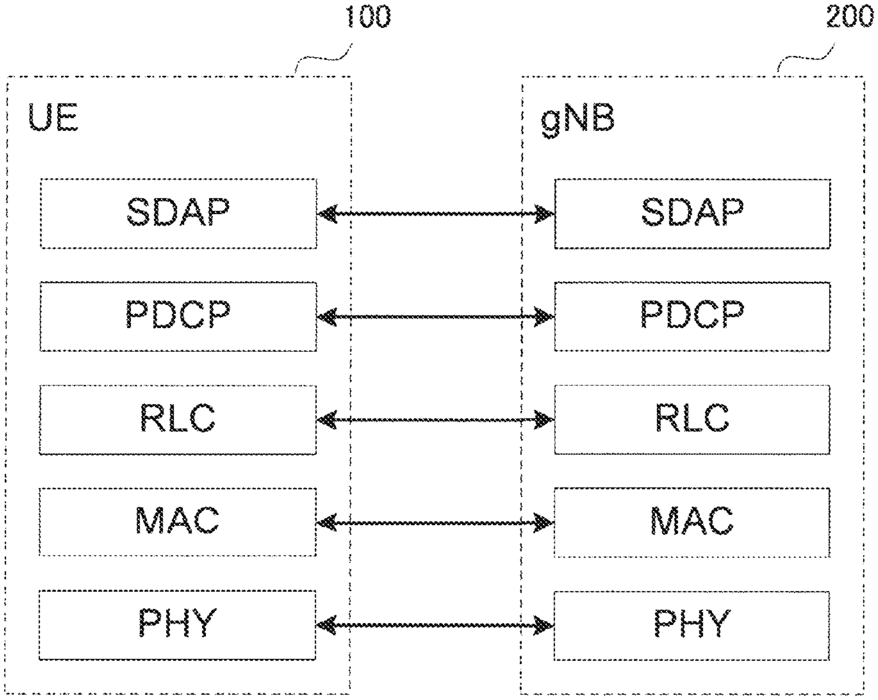
FIG. 4 is a diagram illustrating a configuration of a protocol stack of a radio interface of a user plane handling data.

FIG. 4 is a diagram illustrating a configuration of a protocol stack of a radio interface of a user plane handling data.

A radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel. Note that the PHY layer of the UE 100 receives downlink control information (DCI) transmitted from the gNB 200 over a physical downlink control channel (PDCCH). Specifically, the UE 100 blind-decodes the PDCCH using a radio network temporary identifier (RNTI) and acquires successfully decoded DCI as DCI addressed to the UE 100. The DCI transmitted from the gNB 200 is appended with CRC parity bits scrambled by the RNTI.

The MAC layer performs priority control of data, retransmission processing through a hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 5:
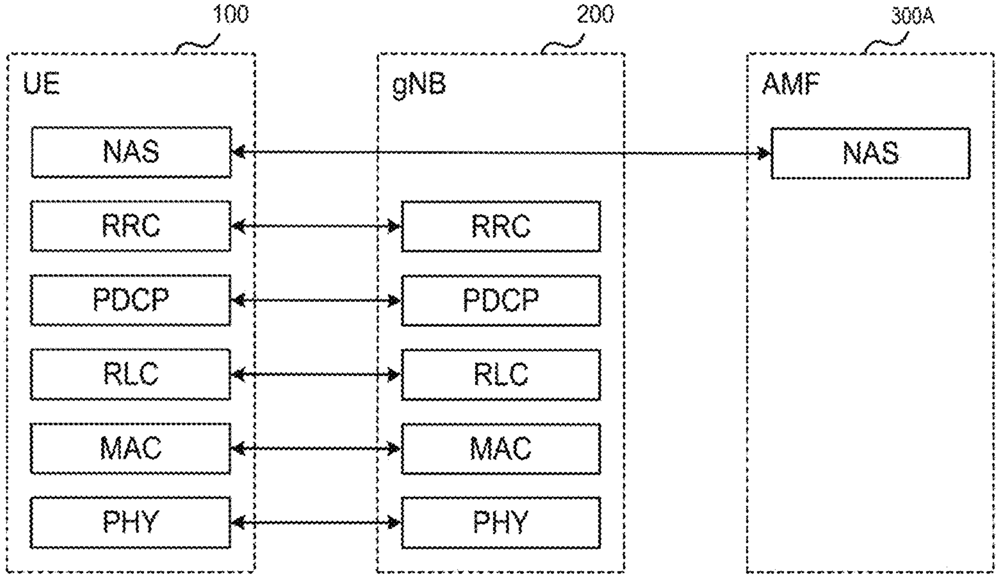
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (a control signal).

The protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned above the RRC layer performs session management, mobility management, and the like. NAS signalling is transmitted between the NAS layer of the UE 100 and the NAS layer of the AMF 300A. Note that the UE 100 includes an application layer other than the protocol of the radio interface. A layer below the NAS layer is referred to as an AS layer.

Overview of MBS

An overview of an MBS according to the first embodiment will be described. The MBS is a service in which the NG-RAN 10 can provide broadcast or multicast, i.e., Point To Multipoint (PTM) data transmission to the UE 100. Note that use cases (service types) of the MBS include public safety communication, mission critical communication, Vehicle to Everything (V2X) communication, IPv4 or IPv6 multicast delivery, Internet Protocol TeleVision (IPTV), group communication, and software delivery.

A broadcast service provides a service to every UE 100 within a particular service area for an application not requiring highly reliable QoS. An MBS session used for the broadcast service is referred to as a broadcast session.

A multicast service provides a service not to every UE 100, but to a group of UEs 100 participating in the multicast service (multicast session). An MBS session used in the multicast service is referred to as a multicast session. The multicast service can provide the same content to the group of UEs 100 through a method with higher radio efficiency, compared with the broadcast service.

Figures 6, 7:
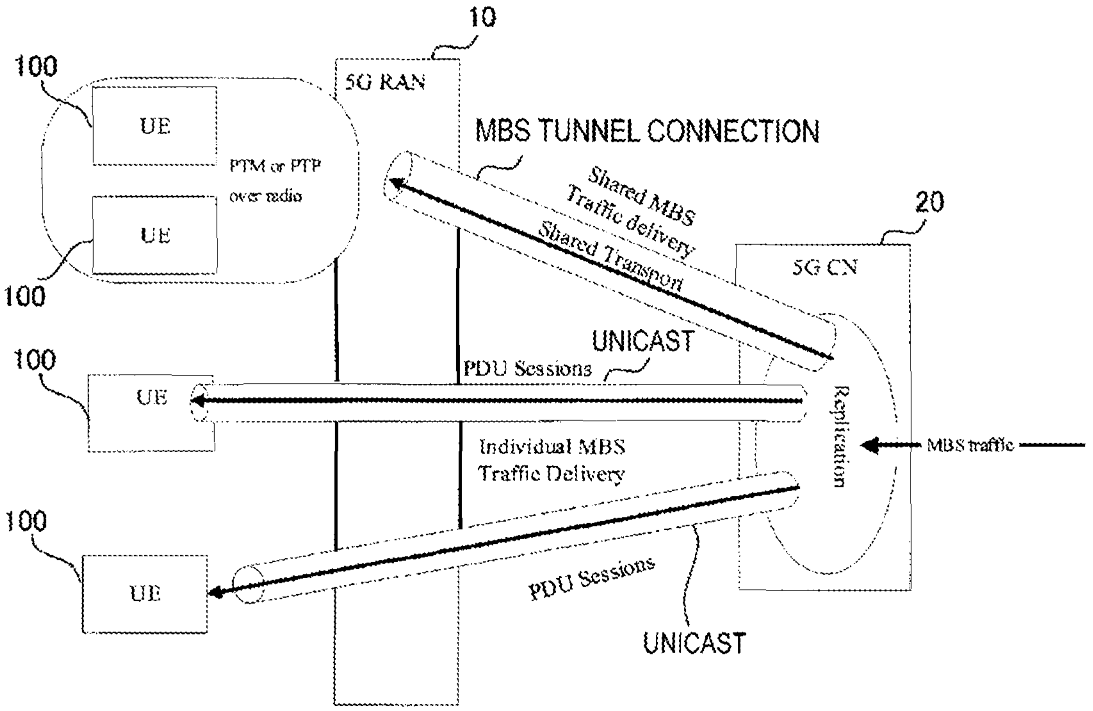
FIG. 6 is a diagram illustrating an overview of MBS traffic delivery according to the first embodiment.
FIG. 7 is a diagram illustrating delivery modes according to the first embodiment.

FIG. 6 is a diagram illustrating an overview of MBS traffic delivery according to the first embodiment.

MBS traffic (MBS data) is delivered from a single data source (application service provider) to a plurality of UEs. The 5G CN (5GC) 20, which is a 5G core network, receives the MBS data from the application service provider and creates a copy of the MBS data (Replication) to deliver the data.

From the perspective of the 5GC 20, two multicast delivery methods are possible: 5GC Shared MBS Traffic delivery and 5GC Individual MBS Traffic delivery.

In the 5GC individual MBS traffic delivery method, the 5GC 20 receives a single copy of MBS data packets and delivers individual copies of these MBS data packets to the individual UEs 100 via a PDU session of each UE 100. Thus, one PDU session for each UE 100 needs to be associated with a multicast session.

In the 5GC shared MBS traffic delivery method, the 5GC 20 receives a single copy of MBS data packets and delivers the single copy of the MBS packets to a RAN node (i.e., gNB 200). The gNB 200 receives the MBS data packets via an MBS tunnel connection and delivers the packets to one or more UEs 100.

From the perspective of the RAN (5G RAN) 10, two delivery methods are possible for wireless transmission of the MBS data in the 5GC shared MBS traffic delivery method, and the methods are a Point-to-Point (PTP) delivery method and a Point-to-Multipoint (PTM) delivery method. PTP means unicast and PTM means multicast and broadcast.

In the PTP delivery method, the gNB 200 wirelessly delivers the individual copies of the MBS data packets to the individual UEs 100. On the other hand, in the PTM delivery method, the gNB 200 wirelessly delivers the single copy of the MBS data packets to a group of the UEs 100. The gNB 200 dynamically determines which method between PTM and PTP needs to be used for one UE 100 as a method for delivering MBS data.

The PTP and PTM delivery methods are mainly related to the user plane. Modes for controlling the MBS data delivery include two delivery modes, which are a first delivery mode and a second delivery mode.

FIG. 7 is a diagram illustrating delivery modes according to the first embodiment.

The first delivery mode (Delivery mode 1: DM1) is a delivery mode that can be used by the UE 100 in the RRC connected state and is a delivery mode for a high QoS requirement. The first delivery mode is used only in multicast sessions among MBS sessions. However, the first delivery mode may also be used in broadcast sessions. The first delivery mode may be available to the UE 100 in the RRC idle state or the RRC inactive state.

A configuration for MBS reception in the first delivery mode is performed through UE-unique (UE-dedicated) signalling. For example, the configuration of MBS reception in the first delivery mode is performed through an RRC Reconfiguration message (or an RRC Release message), which is an RRC message transmitted in unicast from the gNB 200 to the UE 100.

The configuration of MBS reception includes MBS traffic channel configuration information (hereinafter referred to as "MTCH configuration information") about the configuration of an MBS traffic channel carrying MBS data. The MTCH configuration information includes MBS session information relating to an MBS session and scheduling information of the MBS traffic channel corresponding to the MBS session. The scheduling information of the MBS traffic channel may include a discontinuous reception (DRX) configuration of the MBS traffic channel. The discontinuous reception configuration may include one or more parameters of a timer value (On Duration Timer) defining an On Duration (reception period), a timer value (Inactivity Timer) for extending the On Duration, a scheduling interval or DRX cycle (Scheduling Period or DRX Cycle), an offset value (Start Offset or DRX Cycle Offset) of a start subframe of the scheduling or DRX cycle, a start delay slot value (Slot Offset) of the On Duration Timer, a timer value (Retransmission Timer) defining a maximum time until retransmission, and a timer value (HARQ RTT Timer) defining a minimum interval until DL assignment of HARQ retransmission.

Note that the MBS traffic channel is a type of logical channel and may be referred to as an MTCH. The MBS traffic channel is mapped to a downlink shared channel (DL-SCH) that is a type of transport channel.

The second delivery mode (Delivery mode 2 or DM2) is a delivery mode that can be used not only by the UE 100 in the RRC connected state, but also by the UE 100 in the RRC idle state or the RRC inactive state and is a delivery mode for low QoS requirements. The second delivery mode is used for broadcast sessions among MBS sessions. However, the second delivery mode may also be applicable to multicast sessions.

A configuration of MBS reception in the second delivery mode is performed through broadcast signalling. For example, the configuration of the MBS reception in the second delivery mode is performed by a logical channel broadcast from the gNB 200 to the UE 100, for example, a broadcast control channel (BCCH) and/or a multicast control channel (MCCH). The UE 100 may receive the BCCH and the MCCH using a dedicated RNTI predefined in the technical specifications, for example. The RNTI for BCCH reception may be an SI-RNTI and the RNTI for MCCH reception may be an MCCH-RNTI.

In the second delivery mode, the UE 100 may receive MBS data in the following three procedures. First, the UE 100 receives MCCH configuration information through an SIB (MBS-SIB) transmitted on a BCCH from the gNB 200. Second, the UE 100 receives the MCCH from the gNB 200 based on the MCCH configuration information. The MCCH carries MTCH configuration information. Third, the UE 100 receives the MTCH (MBS Data) based on the MTCH configuration information. Hereinafter, the MTCH configuration information and/or the MCCH configuration information may be referred to as an MBS reception configuration.

In the first delivery mode and the second delivery mode, the UE 100 may receive the MTCH using a group RNTI (G-RNTI) allocated from the gNB 200. The G-RNTI corresponds to the RNTI for MTCH reception. The G-RNTI may be included in the MBS reception configuration (MTCH configuration information).

The network can provide different MBS services in each of MBS sessions. The MBS session is identified by at least one selected from the group consisting of a Temporary Mobile Group Identity (TMGI), a source specific IP multicast address (including a source unicast IP address of an application function, an application server, or the like and an IP multicast address indicating a destination address), a session identifier, and the G-RNTI. At least one selected from the group consisting of the TMGI, the source specific IP multicast address, and the session identifier is referred to as an MBS session identifier. The TMGI, the source specific IP multicast address, the session identifier, and the G-RNTI are collectively referred to MBS session information.

Figure 8:
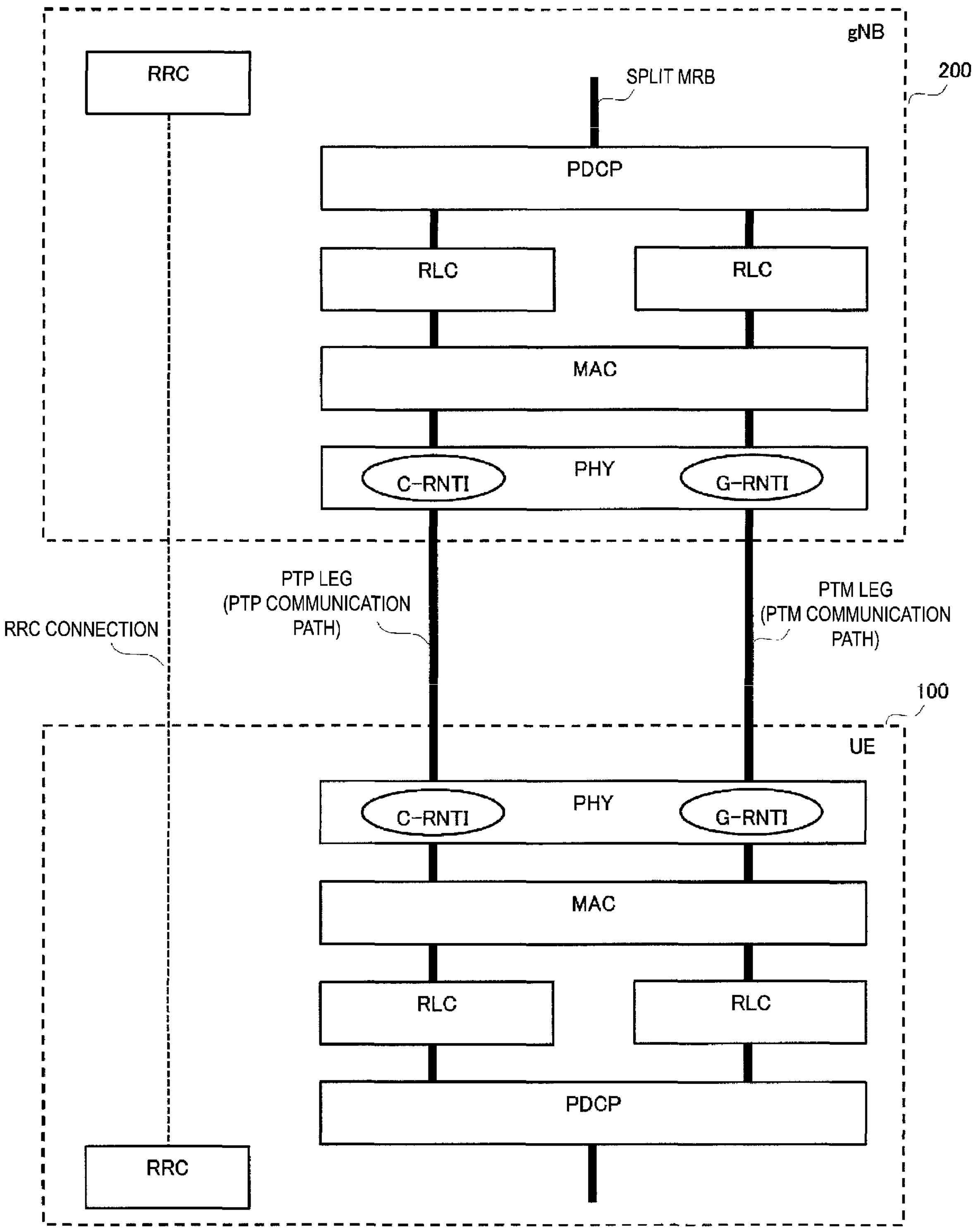
FIG. 8 is a diagram illustrating a split multicast radio bearer (MRB) according to the first embodiment.

FIG. 8 is a diagram illustrating a split multicast radio bearer (MRB) according to the first embodiment. The MRB may be a type of a data radio bearer (DRB). The split MRB may be used in the first delivery mode described above.

The gNB 200 may configure an MRB split into a PTP communication path and a PTM communication path for the UE 100. This allows the gNB 200 to dynamically switch the transmission of the MBS data to the UE 100 between the PTP (PTP communication path) and the PTM (PTM communication path). The gNB 200 may perform duplication transmission of the same MBS data using both the PTP (PTP communication path) and the PTM (PTM communication path) to enhance reliability. Hereinafter, the PTP communication path is referred to as a PTP leg, and the PTM communication path is referred to as a PTM leg. A functional unit corresponding to each layer is referred to as an entity.

A predetermined layer terminating the split is the MAC layer (HARQ), the RLC layer, the PDCP layer, or the SDAP layer. Although an example in which the predetermined layer terminating the split is the PDCP layer will be mainly described below, the predetermined layer may be the MAC layer (HARQ), the RLC layer, or the SDAP layer.

Each of the PDCP entity of the gNB 200 and the PDCP entity of the UE 100 splits an MRB which is a bearer (data radio bearer) used for the MBS into a PTP leg and a PTM leg. Note that the PDCP entity is provided for each bearer.

Each of the gNB 200 and the UE 100 includes two RLC entities provided for the respective legs, one MAC entity, and one PHY entity. The PHY entity may be provided per leg. Note that, in Dual Connectivity in which the UE 100 communicates with two gNBs 200, the UE 100 may include two MAC entities.

The PHY entity transmits and/or receives data of the PTP leg using a Cell Radio Network Temporary Identifier (cell RNTI or C-RNTI) that is allocated to the UE 100 on a one-to-one basis. The PHY entity transmits and/or receives data of the PTM leg using the G-RNTIs allocated to the MBS sessions on a one-to-one basis. Although a C-RNTI is different depending on each UE 100, a G-RNTI is an RNTI common to a plurality of UEs 100 receiving one MBS session.

In order to perform PTM transmission of the MBS data (multicast or broadcast) from the gNB 200 to the UE 100 using the PTM leg, a split MRB needs to be configured for the UE 100 from the gNB 200 and the PTM leg needs to be activated (activation). In other words, even if a split MRB is configured for the UE 100, when a PTM leg is in a deactivated state, the gNB 200 cannot perform PTM transmission of the MBS data using the PTM leg.

For the gNB 200 and the UE 100 to perform PTP transmission of the MBS data (unicast) using the PTP leg, a split MRB needs to be configured for the UE 100 from the gNB 200 and the PTP leg needs to be activated. In other words, even if a split MRB is configured for the UE 100, when the PTP leg is in a deactivated state, the gNB 200 cannot perform PTP transmission of the MBS data using the PTP leg.

When the PTM leg is in an activated state, the UE 100 monitors a PDCCH to which the G-RNTI associated with the MBS session is applied (i.e., performs blind decoding of the PDCCH using the G-RNTI). The UE 100 may monitor the PDCCH only at a scheduling occasion of the MBS session.

When the PTM leg is in a deactivated state, the UE 100 does not monitor a PDCCH to which a G-RNTI associated with the MBS session is applied (i.e., does not perform blind decoding of the PDCCH using the G-RNTI).

When the PTP leg is in an activated state, the UE 100 monitors a PDCCH to which a C-RNTI is applied. When Discontinuous Reception (DRX) in the PTP leg is configured, the UE 100 monitors a PDCCH for a configured OnDuration period. When a cell (frequency) associated with the MBS session is specified, the UE 100 may monitor a PDCCH for the cell even when the cell is deactivated.

When the PTP leg is in a deactivated state, the UE 100 may monitor a PDCCH to which a C-RNTI is applied in preparation for normal unicast downlink transmission other than the MBS data. Note that, when a cell (frequency) associated with an MBS session is specified, the UE 100 need not monitor a PDCCH for the MBS session.

Note that the above-described split MRB is assumed to be configured by an RRC message (for example, an RRC Reconfiguration message) transmitted by the RRC entity of the gNB 200 to the RRC entity of the UE 100.

Operation of Mobile Communication System

An operation of the mobile communication system 1 according to the first embodiment will be described.

Figure 9:
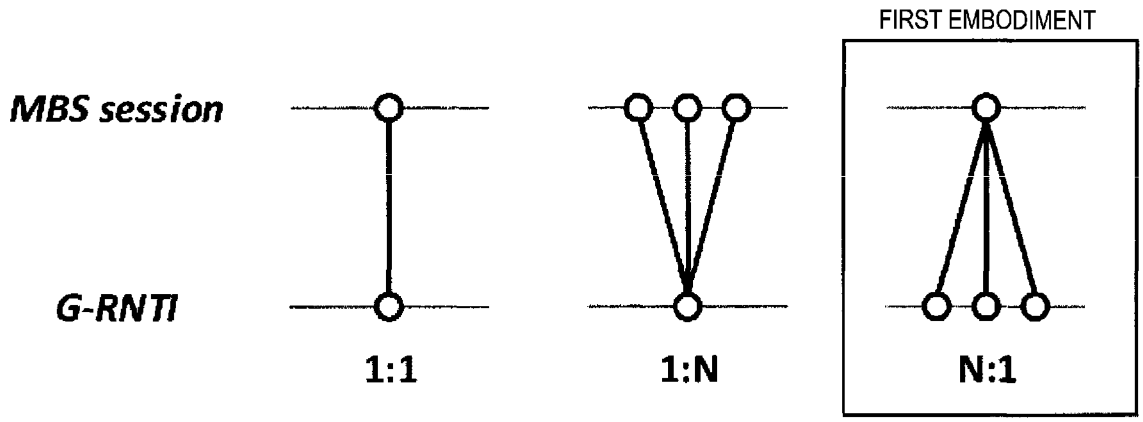
FIG. 9 is a diagram illustrating a correspondence relationship (mapping) between a group RNTI (G-RNTI) and an MBS session.

FIG. 9 is a diagram illustrating a correspondence relationship (mapping) between a group RNTI (G-RNTI) and an MBS session. The G-RNTI may be a G-Configured Scheduling (CS)-RNTI. In the following description, the G-RNTI may be replaced with G-CS-RNTI. For example, two G-RNTIs may include one G-RNTI and one G-CS-RNTI. Note that the G-CS-RNTI is a G-RNTI used for Configured Scheduling in which the same radio resource is allocated in a fixed period, and the radio resource specified by the G-CS-RNTI is allocated to a plurality of UEs in a period (periodicity) configured by the RRC.

Mapping between a G-RNTI and an MBS session includes "one-to-one mapping" in which one G-RNTI is associated with one MBS session, "one-to-N mapping" in which one G-RNTI is associated with N (N≥2) MBS sessions, and "N-to-one mapping" in which N G-RNTIs are associated with one MBS session. In the first embodiment, use of "N-to-one mapping" is mainly assumed.

Figure 10:
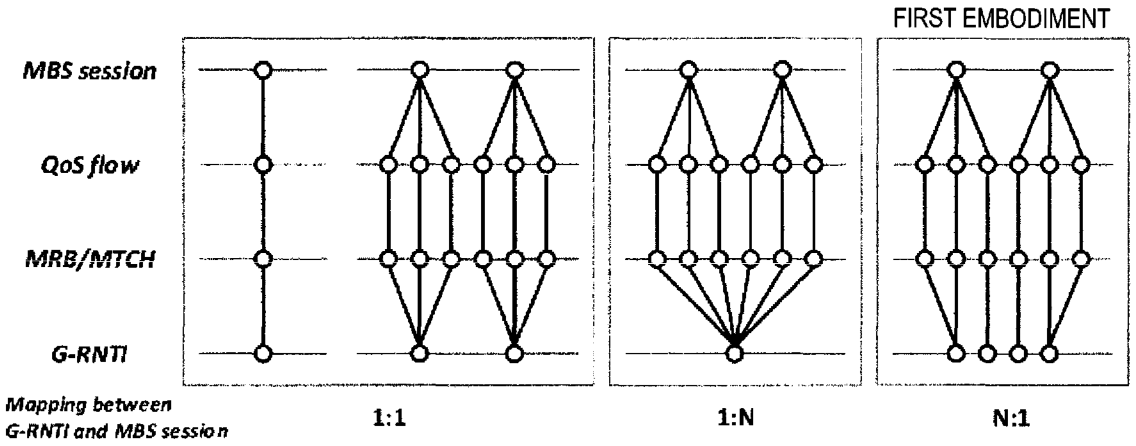
FIG. 10 is a diagram illustrating a correspondence relationship (mapping) between a G-RNTI, a multicast radio bearer (MRB)/multicast traffic channel (MTCH), a quality-of-service (QOS) flow, and an MBS session.

FIG. 10 is a diagram illustrating a correspondence relationship (mapping) between a G-RNTI, a multicast radio bearer (MRB)/multicast traffic channel (MTCH), a quality-of-service (QoS) flow, and an MBS session. There is a case in which a plurality of QoS flows are associated with one MBS session and a case in which a plurality of QoS flows are associated with one G-RNTI. The QoS flow and the MRB/MTCH may be in a 1:1 relationship.

In the N-to-one mapping, when a plurality of QoS flows are associated with one MBS session (for example, one MBS application), MBS data can be transmitted and/or received with different configurations for each QoS flow (for example, different MTCH configurations for each QoS flow) . For example, when group communication using a video conference application is considered, a scenario in which the QoS flow #1 carries video and the QoS flow #2 carries text messages (chat) is assumed. In such a scenario, data transmission and/or reception with the following configurations is considered optimal, for example.

QoS flow #1: RLC UM, DRX cycle=short

QoS flow #2: RLC AM, DRX cycle=long

Here, "#1" and "#2" are QoS flow identifiers, "RLC UM" means that the RLC mode is an unacknowledged mode (UM), and "RLC AM" means that the RLC mode is an acknowledged mode (AM). The DRX cycle means a cycle at which the UE 100 in the discontinuous reception wakes up.

Since one MBS session includes two DRX cycles, the UE 100 has to wake up twice within a certain period of time by using such a configuration, and this is not preferable in terms of reception efficiency (power consumption) of the UE 100. In the first embodiment, only some QoS flows among a plurality of QOS flows associated with one MBS session can be received.

The communication method according to the first embodiment is a method used in the UE 100 that performs reception processing of a PDCCH from the gNB 200 (hereinafter referred to as a "PDCCH reception processing") using a radio network temporary identifier (RNTI). The communication method includes, when N (N≥2) G-RNTIs are associated with one MBS session, specifying M (M<N) G-RNTIs to be used in the PDCCH reception processing from among the N G-RNTIs; and performing PDCCH reception processing using the M G-RNTIs (where M can be equal to N). For example, in the reception of the MBS session, the UE 100 does not use (N−M) G-RNTIs among the N G-RNTIs for the PDCCH reception processing but uses M G-RNTIs to perform the PDCCH reception processing. Thus, when M<N, the UE 100 can receive only a part of the QoS flows among the plurality of QoS flows associated with one MBS session.

Note that the PDCCH reception processing refers to processing in which the UE 100 performs blind decoding of a PDCCH (DCI) using an RNTI and performs CRC check using the CRC parity bit assigned to the DCI and may be referred to as PDCCH monitoring processing.

The timing at which the UE 100 wakes up may be determined by the MTCH configuration associated with the M G-RNTIs used for the PDCCH reception processing. That is, since the UE 100 may not apply the MTCH configuration associated with the (N−M) G-RNTIs, the UE may not wake up according to the corresponding MTCH configuration. This reduces power consumption of the UE 100.

The UE 100 may specify a desired QoS flow that it desires to receive from among K (K≥2) QoS flows associated with one MBS session and specify M G-RNTIs associated with the desired QoS flow. The desired QoS flow may be determined by an upper layer of the UE 100, e.g., the application layer and/or the NAS layer.

The UE 100 may receive information (mapping information) in which one MBS session, K QoS flows, and N G-RNTIs are associated from the gNB 200. As a result, the UE 100 can clearly (concretely) ascertain the correspondence relationship (mapping) between the MBS session, the QoS flow, and the G-RNTIs.

The UE 100 may transmit, to the gNB 200, a message including the identifier of the MBS session (MBS session having been received by the UE 100 or in which the UE is interested to receive) and the identifiers of the desired QoS flows belonging to that MBS session. As a result, the gNB 200 can ascertain which QoS flow of which MBS session the UE 100 desires to receive, that is, which QoS flow has been received (or is interested to receive). Accordingly, the gNB 200 can appropriately control the scheduling of the MRB/MTCH associated with the QoS flow that the UE 100 desires to receive, for example.

Figure 11:
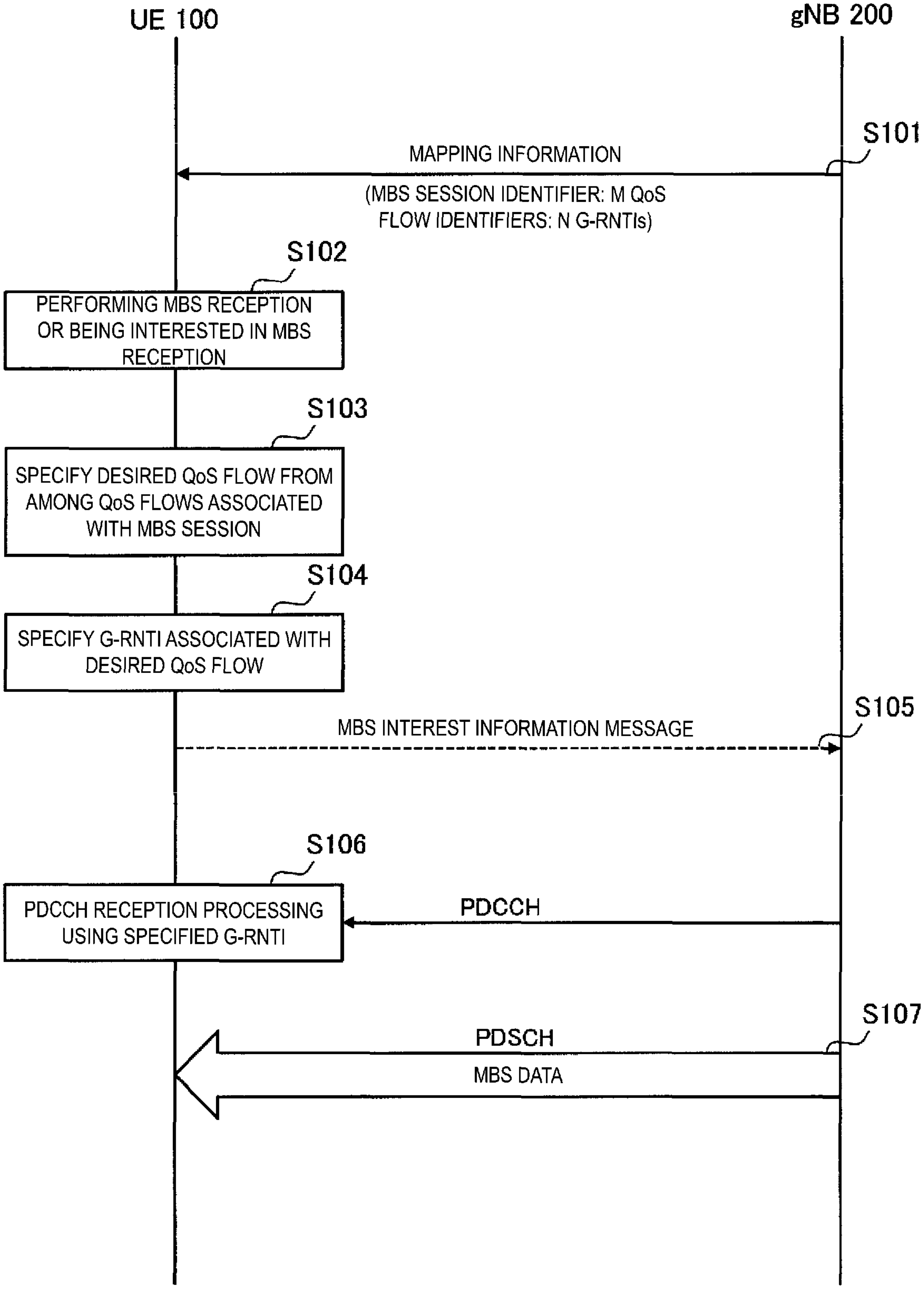
FIG. 11 is a diagram illustrating an example of an operation according to the first embodiment.

FIG. 11 is a diagram illustrating an example of an operation according to the first embodiment. The RRC state of the UE 100 may be any state (RRC connected state, RRC idle state, and RRC inactive state). The MBS delivery mode may be the first delivery mode or the second delivery mode.

In step S101, the gNB 200 transmits the mapping information of the MBS session, the QoS flows, and the G-RNTI to the UE 100. The gNB 200 may transmit the mapping information through broadcast signalling (SIB or MCCH) or transmit the mapping information through UE-specific signalling (RRC Reconfiguration message or RRC Release message). The mapping information may include one or more sets of an MBS session identifier, a QoS flow identifier, and a G-RNTI. The mapping information may be notified from the AMF 300A to the UE 100 by a NAS message.

In step S102, the UE 100 is receiving an MBS session or is interested to receive the MBS session. Note that step S101 may be performed after step S102.

In step S103, the UE 100 specifies a desired QoS flow that it desires to receive from among K (K≥2) QoS flows associated with the MBS session. The desired QoS flow may be a single QoS flow or multiple QoS flows.

Here, an upper layer (such as an application layer) of the UE 100 may notify the AS layer of the identifier of a required QoS flow in the MBS session. For example, in a video conference application, the upper layer may notify the AS layer that the video streaming (QoS flow #1) is being used and thus is necessary, but the chat function (QOS flow #2) is off and thus is not necessary.

In step S104, the UE 100 specifies the M G-RNTIs associated with the desired QoS flow specified in step S103.

In step S105, the UE 100 may transmit, to the gNB 200, an MBS interest information message including the identifier of the MBS session (MBS session having been received by the UE 100 or in which the UE is interested to receive) and the identifiers of the desired QoS flows belonging to that MBS session. The identifiers of the desired QoS flows may be, for example, an identifier of the desired QoS flow, an identifier of a QoS flow other than the desired QoS flows among the K QoS flows, or a G-RNTI associated with the desired QoS flows. The MBS interest information message may be a type of RRC message and, for example, may be an MBS Interest Indication message or a UE Assistance Information message. The gNB 200 that has received the MBS interest information message may stop transmission of QoS flows that are not desired by the UE 100 or change the configuration of the UE 100 (for example, delete the configurations of the QoS flows that are not desired by the UE 100) based on information included in the MBS interest information message (in particular, the identifier of the desired QoS flow). Note that step S105 may be performed before step S104.

In step S106, the UE 100 performs PDCCH reception processing using the M G-RNTIs specified in step S104. Accordingly, the UE 100 acquires the scheduling information of the PDSCH to which the MTCH is mapped from the DCI.

In step S107, the UE 100 receives the MBS data on the PDSCH from the gNB 200.

Second Embodiment

A second embodiment will be described focusing on differences from the first embodiment.

Figure 12:
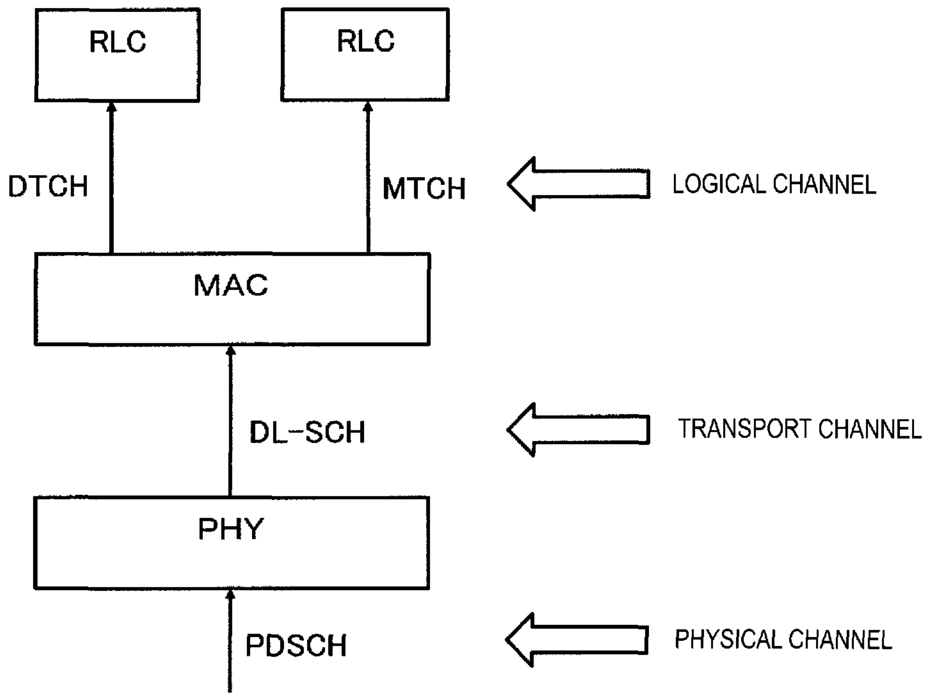
FIG. 12 is a diagram illustrating internal processing of a UE according to a second embodiment.

FIG. 12 is a diagram illustrating internal processing of the UE 100 according to the second embodiment. The PHY layer of the UE 100 processes user data (received data) received on the PDSCH, which is one of physical channels, and routes the processed user data to the downlink shared channel (DL-SCH), which is one of transport channels. The MAC layer of the UE 100 processes the data received on the DL-SCH and routes the received data to a corresponding logical channel (corresponding RLC entity) based on a logical channel identifier (LCID) included in the header (MAC header) included in the received data.

Here, the logical channel for the user data includes a dedicated traffic channel (DTCH) and a multicast traffic channel (MTCH). The DTCH is a logical channel for unicast, and the MTCH is a logical channel for multicast/broadcast. The gNB 200 may allocate the LCID to each logical channel. Note that the DTCH may be a logical channel for PTP in multicast/broadcast, and the MTCH may be a logical channel for PTM in multicast/broadcast.

When different LCIDs are allocated to the DTCH and the MTCH, the MAC layer may route the received data to on an appropriate logical channel based on the LCID included in the MAC header. However, for example, from the viewpoint of reducing the restriction on the LCID, that the LCID space is not divided for the DTCH and the MTCH is also assumed.

If that the LCID space is not divided is defined, there is no particular problem if the gNB 200 allocates different LCIDs to the MTCH and the DTCH. However, since the MTCH is a logical channel common to a plurality of UEs, there is a concern that the DTCH and the MTCH may have the same LCID for a certain UE 100. In the second embodiment, even when the same LCID is allocated to the DTCH and the MTCH, received data can be routed to an appropriate logical channel. In other words, since the same LCID can be allocated to the DTCH and the MTCH, a finite number of LCIDs can be effectively used. That is, although two independent LCIDs are originally required for the DTCH and the MTCH, one common LCID can be allocated. Complexities can be avoided by allocating and managing independent LCIDs of the DTCH and the MTCH.

The communication method according to the second embodiment is a method used in the UE 100 that performs processing of receiving a PDCCH from the gNB 200 using an RNTI. The communication method includes a step of performing PDCCH reception processing for receiving a DTCH using a cell RNTI (C-RNTI), a step of performing PDCCH reception processing for receiving an MTCH using a G-RNTI, and a step of specifying a logical channel to which received data obtained according to the PDCCH reception processing belongs based on the RNTI used in the PDCCH reception processing when the same LCID is allocated to the DTCH and the MTCH. As described above, by specifying the logical channel to which the received data obtained in the PDCCH reception processing belongs based on the RNTI used according to the PDCCH reception processing, the received data can be routed on an appropriate logical channel even when the same LCID is allocated to the DTCH and the MTCH.

Specifically, when the LCID included in the header of the MAC PDU that is the received data is the same LCID for the DTCH and the MTCH, the MAC layer of the UE 100 specifies the DTCH as the logical channel to which the received data obtained according to the PDCCH reception processing using the C-RNTI belongs. On the other hand, the MTCH is specified as the logical channel to which the received data obtained according to the PDCCH reception processing using the G-RNTI belongs. The MAC layer of the UE 100 outputs the received data (MAC SDU/RLC PDU) to the specified logical channel.

Note that, in the second embodiment, the UE 100 may receive, from the gNB 200, information in which a data radio bearer (DRB) is associated with the LCID of the DTCH and information in which a multicast radio bearer (MRB) is associated with the LCID of the MTCH.

Figure 13:
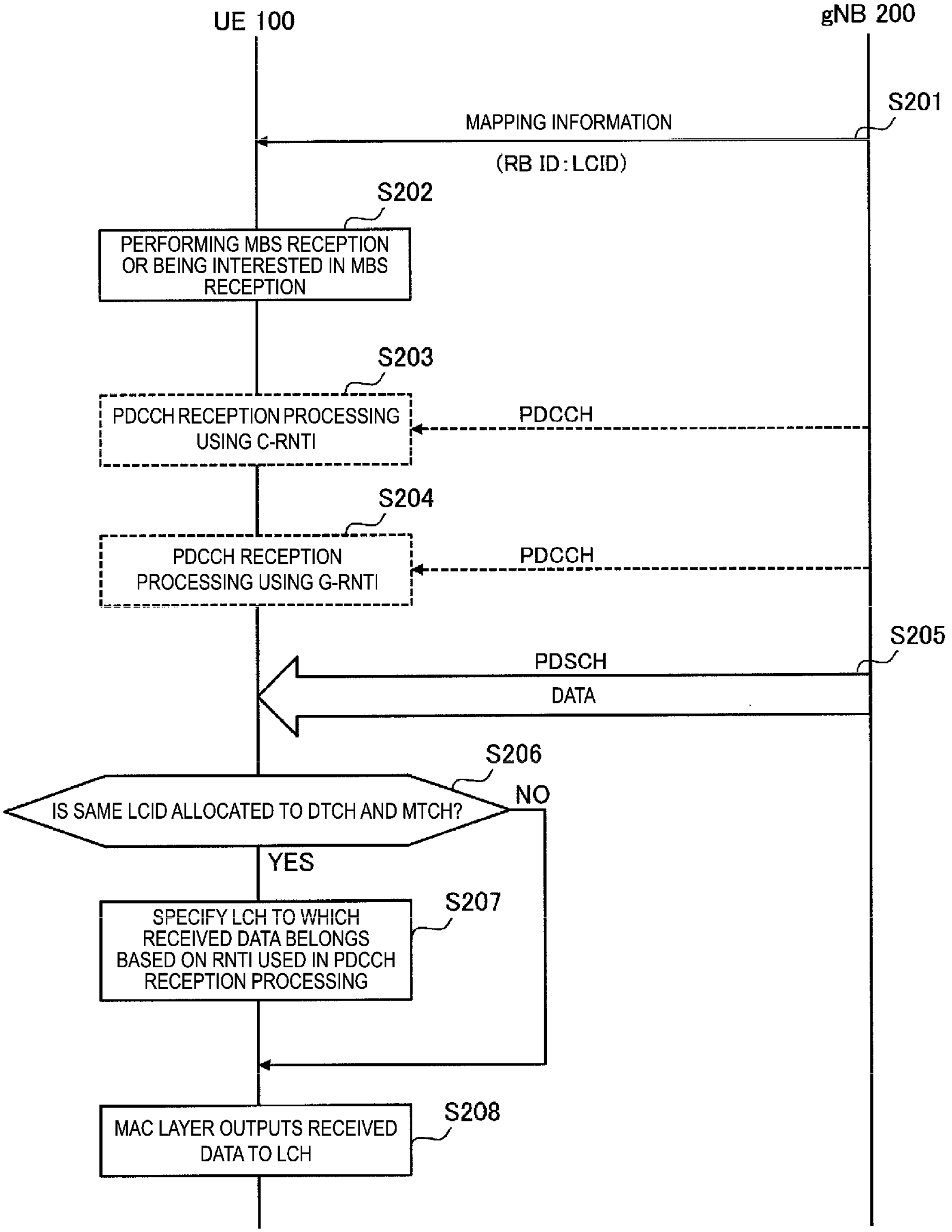
FIG. 13 is a diagram illustrating an example of an operation according to the second embodiment.

FIG. 13 is a diagram illustrating an example of an operation according to the second embodiment. The RRC state of the UE 100 may be any state (RRC connected state, RRC idle state, and RRC inactive state). For example, the RRC state of the UE 100 may be an RRC connected state. The MBS delivery mode is the first delivery mode or the second delivery mode. For example, the MBS delivery mode may be the first delivery mode.

In step S201, the gNB 200 notifies the UE 100 of mapping information of the LCID of the DTCH and the LCID of the MTCH. For example, the gNB 200 transmits, to the UE 100, information in which DRB #1 is associated with DTCH LCID #1 and information in which MRB #2 is associated with MTCH LCID #1. That is, in the present operation example, the same LCID may be associated with the DTCH and the MTCH. When the UE 100 recognizes that the LCIDs are identical, the following operations may be performed.

In step S202, the UE 100 is receiving an MBS session or is interested to receive an MBS session. Note that step S201 may be performed after step S202.

In step S203, the UE 100 may perform unicast reception on DTCH LCID #1 using a C-RNTI. To be more specific, the UE 100 may perform DTCH reception by performing PDCCH reception processing using the C-RNTI.

In step S204, the UE 100 may perform multicast reception on MTCH LCID #1 using a G-RNTI. To be more specific, the UE 100 may perform MTCH reception by performing PDCCH reception processing using the G-RNTI. Note that step S204 may be performed before step S203.

In step S205, the UE 100 receives user data on the PDSCH in response to step S203 or step S204. For example, the user data received on the PDSCH in response to step S203 may be unicast data, and the user data received on the PDSCH in response to step S204 may be MBS data (multicast data or broadcast data).

When the same LCID is associated with the DTCH and the MTCH (YES in step S206), in step S207, the UE 100 (MAC layer) specifies the corresponding logical channel based on the RNTI used for the data (packets) received in step S205. When the packets have been received with the C-RNTI, the UE 100 routes the packets to LCID #1 associated with DRB #1 (DTCH) (step S208). On the other hand, when the packets have been received with the G-RNTI, the UE 100 routes the packets to LCID #1 associated with MRB #2 (MTCH) (step S208).

When the same LCID is not associated with the DTCH and the MTCH (NO in step S206), in step S208, the UE 100 (MAC layer) routes the packets to the logical channel indicated by the LCID included in the header of the packets (MAC PDU).

Figure 14:
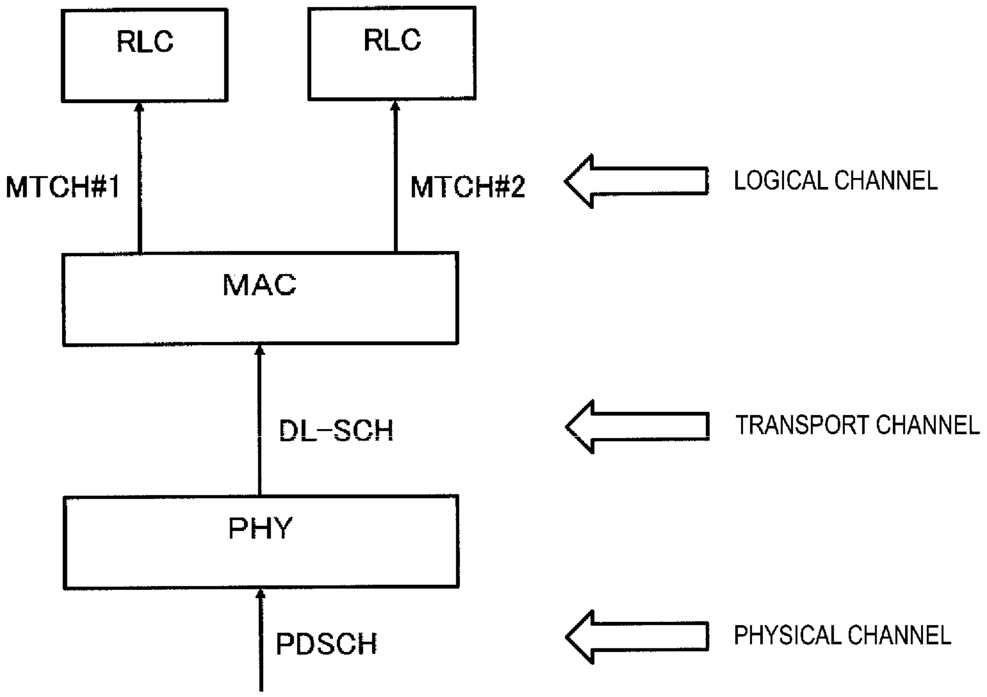
FIG. 14 is a diagram illustrating internal processing of a UE according to an example of a variation of the second embodiment.

Although the reception method when the DTCH and the MTCH have the same LCID has been described in the second embodiment, the present disclosure is not limited to this. The operation according to the second embodiment is applicable even when different MTCHs have the same LCID. As illustrated in FIG. 14, when MTCH #1 is transmitted and/or received with G-RNTI #1 and MTCH #2 is transmitted and/or received with G-RNTI #2, even when the same LCID is allocated (set) to MTCH #1 and MTCH #2, the UE 100 is able to route data to an appropriate RLC entity with G-RNTI #1 and G-RNTI #2 used for the reception processing.

Third Embodiment

Differences of a third embodiment from the first and second embodiments will mainly be described.

In the second delivery mode, the UE 100 acquires MTCH configuration information by receiving an MCCH from the gNB 200 and receives an MTCH (MBS-data) based on the MTCH configuration information. Here, the content of the MCCH may be modified. A period during which the content of the MCCH is maintained may be referred to as an MCCH modification period. The predetermined timing at which the content of the MCCH can be modified may be referred to as an MCCH modification boundary.

Reception of the MCCH (in particular, the PDSCH which is a physical channel) and deciphering of the content by a UE 100 which is performing MBS reception or is interested to receive an MBS at each MCCH modification boundary leads to an increase in a load and power consumption. Therefore, that the notification regarding the content modification of the MCCH is transmitted from the gNB 200 to the UE 100 on the PDCCH (in the DCI) at a predetermined timing is assumed. By this means, since the UE 100 can determine whether receiving the MCCH is necessary, reception of an unnecessary MCCH can be curbed. The MCCH modification notification may be transmitted based on the content modification of the MCCH, for example, an MBS session start, an MBS session change, or an MBS session stop. The MCCH modification notification may be configured as one bit in the DCI, i.e., a one-bit flag that is set to "1" only when there is a change.

However, the UE 100 that does not receive the MCCH modification notification at a predetermined timing, that is, the UE 100 that does not detect a bit indicating an MCCH modification, is not able to determine whether it is caused by a transmission error (loss in a radio section) of a PDCCH (DCI) or caused by no modification in the MCCH. Therefore, in consideration of the possibility that a transmission error of the PDCCH (DCI) occurs, the UE 100 that does not receive the MCCH modification notification at a predetermined timing may need to receive the MCCH and decipher the content thereof. The third embodiment is an embodiment to solve the problem as described above.

The communication method according to the third embodiment includes a step of transmitting, by a gNB 200, configuration information used for reception of an MTCH (MTCH configuration information) on an MCCH, and a step of transmitting, by the gNB 200, a notification (hereinafter referred to as an "MCCH notification") related to a content modification of the MCCH (hereinafter referred to as an "MCCH modification") to the UE 100 on a physical downlink control channel (PDCCH) at a predetermined timing. The step of transmitting includes a step of transmitting an MCCH notification indicating no MCCH modification if there is no modification in the MCCH. In this way, when there is no MCCH modification, the UE 100 can clearly ascertain that there is no MCCH modification by transmitting the MCCH notification indicating that there is no MCCH modification. Therefore, the UE 100 that does not receive the MCCH notification at a predetermined timing can determine that it was caused by the transmission error of the PDCCH (DCI). Therefore, the UE 100 can avoid receiving an unnecessary MCCH.

For example, when there is an MCCH modification, the gNB 200 transmits a first value indicating that there is an MCCH modification as an MCCH notification. When there is no MCCH modification, the gNB 200 transmits a second value indicating that there is no MCCH modification as an MCCH notification. Accordingly, the UE 100 can clearly ascertain whether the MCCH has been modified.

For example, the UE 100 may attempt to receive the MCCH upon receiving the first value on the PDCCH. The UE 100 may omit reception of the MCCH upon receiving the second value on the PDCCH. If the UE 100 failed to receive the MCCH notification on the PDCCH at a predetermined timing, it may attempt to receive the MCCH.

Figure 15:
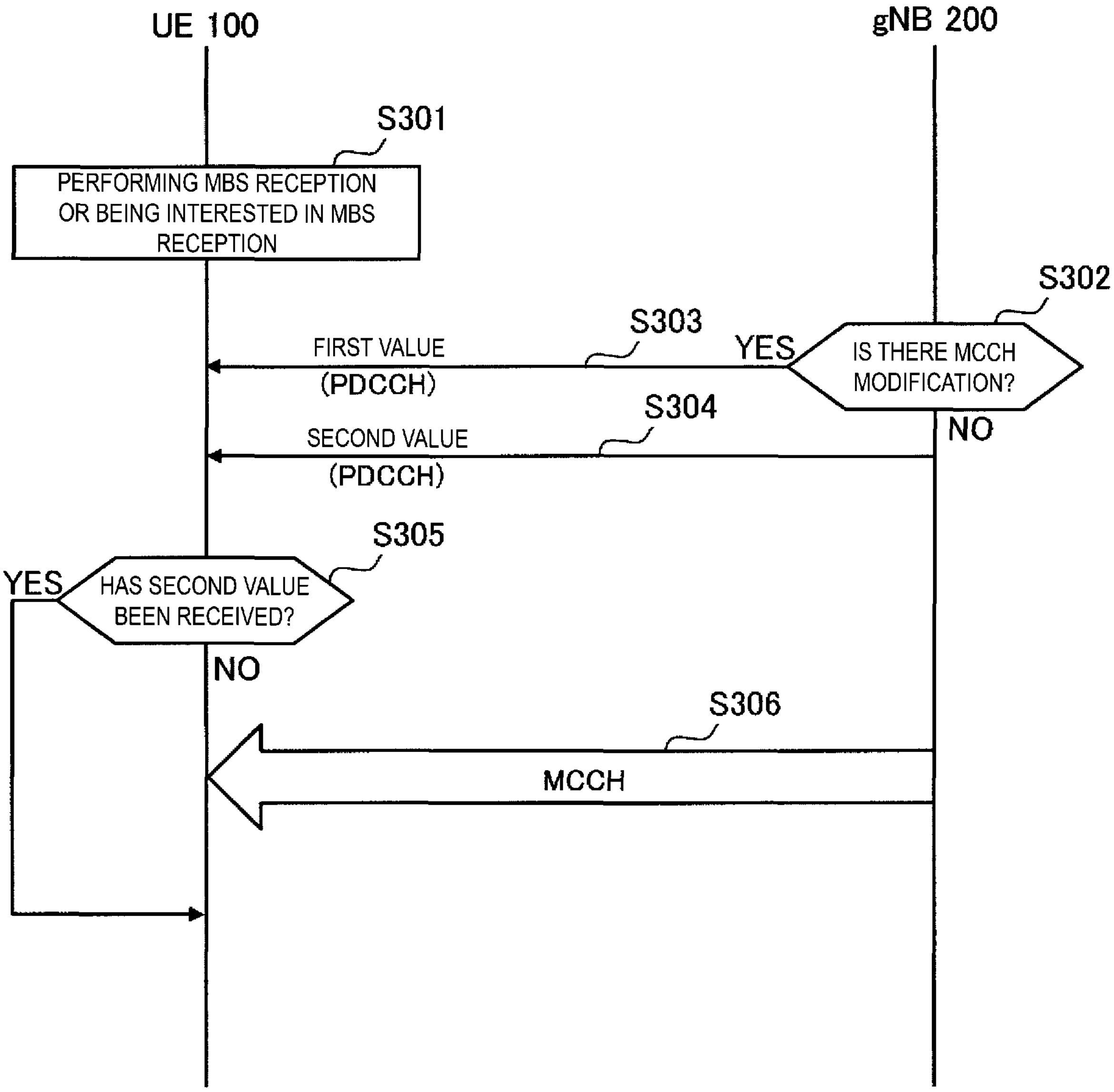
FIG. 15 is a diagram illustrating an example of an operation according to a third embodiment.

FIG. 15 is a diagram illustrating an example of an operation according to the third embodiment. The RRC state of the UE 100 may be any state (RRC connected state, RRC idle state, and RRC inactive state). The MBS delivery mode may be the second delivery mode.

In step S301, the UE 100 is receiving an MBS session or is interested to receive an MBS session.

In steps S302 to S304, the gNB 200 performs transmission processing for an MCCH notification. Here, the MCCH notification is configured with certain bits of a DCI. An MCCH notification based on an MBS session start and an MCCH notification based on an MBS session change and/or stop may be notified using the same bit or different bits. In addition, the MCCH notification may be performed using a different bit for each MBS session or using a common bit (only one bit) for all sessions. (Each) bit constituting the MCCH notification may be defined as "no modification" when it is "0" and as "modified" when it is "1". In addition, (each) bit constituting the MCCH notification may have the opposite relationship of 0 and 1. The gNB 200 transmits the MCCH notification regardless of whether there is an MCCH modification.

When there is an MCCH modification (YES in step S302), the gNB 200 transmits a first value (for example, "1") indicating that there is an MCCH modification as an MCCH notification at a predetermined timing in step S303.

On the other hand, when there is no MCCH modification (NO in step S302), the gNB 200 transmits a second value (for example, "0") indicating that there is no MCCH modification as an MCCH notification at a predetermined timing in step S304.

The UE 100 attempts to receive the MCCH notification (DCI) at a predetermined timing (MCCH modification boundary).

Here, when the UE 100 normally receives the MCCH notification and the received MCCH notification has the second value (YES in step S305), the UE 100 does not attempt to receive the MCCH (PDSCH).

On the other hand, when the MCCH notification is normally received and the received MCCH notification has the first value, the UE 100 attempts to receive the MCCH (PDSCH) (step S306). When the UE 100 cannot normally receive the MCCH notification, the UE 100 attempts to receive the MCCH (PDSCH) (step S306). To be more specific, the UE 100 attempts to receive the PDCCH (DCI) carrying scheduling information of the MCCH (PDSCH). Note that the DCI configuring the MCCH notification may be scrambled with a dedicated RNTI (for example, SC-N-RNTI), and the DCI for the MCCH may be scrambled with a dedicated RNTI (for example, SC-RNTI). These RNTIs may be fixed RNTIs defined in the technical specifications. The UE 100 checks the received MCCH and applies the content (configuration) of the MCCH when there is a modification.

Figure 16:
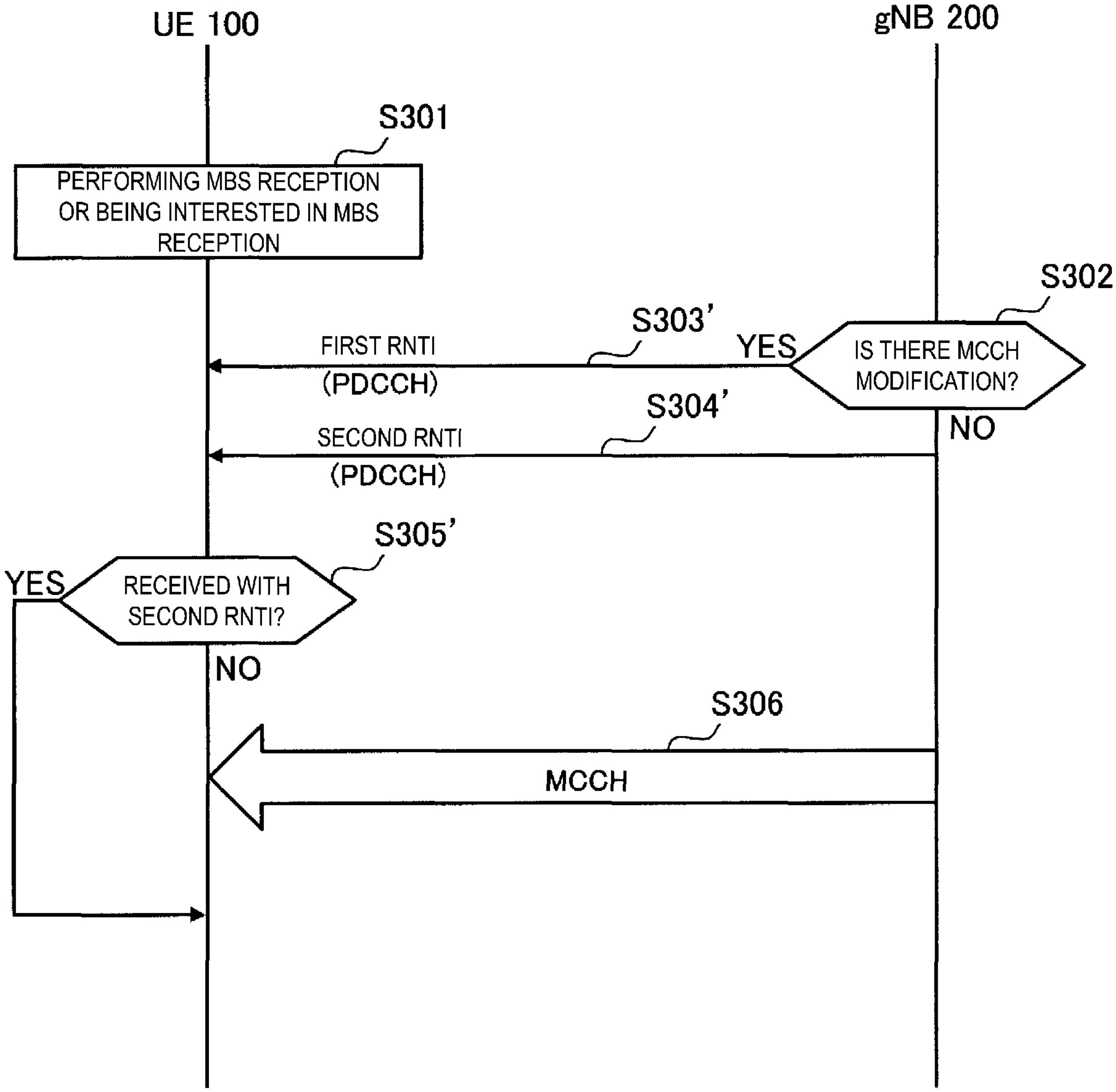
FIG. 16 is a diagram illustrating an example of a variation in the operation according to the third embodiment.

Although an example in which the presence or absence of an MCCH modification is represented by the value of the bit has been described in the second embodiment, the presence or absence of an MCCH modification may be represented by the value of the RNTI. In this case, the value of the bit may be a fixed value regardless of whether there is an MCCH modification. As illustrated in steps S303', S304', and S305' of FIG. 16, when an MCCH notification is transmitted with the first RNTI (RNTI #1), it may be defined as "no modification", and when an MCCH notification is transmitted with the second RNTI (RNTI #2), it may be defined as "modified".

Other Embodiments

The operation flows described above can be separately and independently implemented, and also be implemented in combination of two or more of the operation flows. For example, some of the steps in one operation flow may be applied to another operation flow. Some of the steps in one operation flow may be replaced with some of the steps in another operation flow.

Although an example in which the base station is an NR base station (i.e., gNB) has been described in the embodiment and examples described above, the base station may be an LTE base station (i.e., eNB) or a 6G base station. The base station may be a relay node such as an Integrated Access and Backhaul (IAB) node. The base station may be a DU of an IAB node. A user equipment may be a mobile termination (MT) of the IAB node.

A program causing a computer to execute each of the processing operations performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing processing performed by the UE 100 or the gNB 200 may be integrated, and at least a part of the UE 100 or the gNB 200 may be implemented as a semiconductor integrated circuit (chipset, System on a chip (SoC)).

The phrases "based on" and "depending on" used in the present disclosure do not mean "based only on" and "only depending on", unless specifically stated otherwise. The phrase "based on" means both "based only on" and "at least partially based on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise", and variations thereof do not mean "include only items stated" but instead mean "may include only items stated" or "may include not only the items stated but also other items". The term "or" used in the present disclosure is not intended to be "exclusive or". Any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a", "an", and "the" are added in the present disclosure for translation, these articles are assumed to include the plural unless clearly indicated otherwise in context.

Embodiments have been described above in detail with reference to the drawings, but specific configurations are not limited to those described above, and various design variation can be made without departing from the gist of the present disclosure.

Supplementary Note 1

1. Introduction

RAN #88 has approved revised work items that are related to the NR multicast and broadcast service (MBS).

RAN2 has agreed on two delivery modes. That is, the modes are delivery mode 1 of a multicast session received by UE in the connected state and delivery mode 2 of a broadcast session received by all UEs in the RRC state.

RAN2 has also agreed on the details of the MCCH scheduling method, that is, the MCCH repetition period, the MCCH transmission window, the search space, and the MCCH modification period.

RAN2 #114-e reached the following agreement about the two delivery modes.

PCCH is used for multicast activation notification (also used for MBS support nodes). Transmission of the MBS session ID is confirmed in the notification.

Use of paging in all (legacy) POs using PRNTI is a baseline assumption (other changes can also be discussed).

An MBS-specific SIB is defined to perform an MCCH configuration.

The content of an MCCH needs to include information about a broadcast session such as a G-RNTI and an MBS session ID, and schedule information of an MTCH (search space, DRX, and the like).

An L1 parameter that needs to be included in the MCCH are reserved for further progress and input of RAN1.

The discussion of whether a dedicated MCCH configuration is needed is deferred until RAN1 proceeds with BWP/CFR of the MCCH.

An indication of an MCCH modification due to a modification in the configuration of an ongoing session (including session termination) is provided in an explicit notification from a network (if RAN1 confirms that, in addition to the bits for the session start notification, another bit for this purpose can be accommodated in the MCCH modification notification DCI). Whether this notification can be reused to change other information carried by the MCCH needs further consideration.

Whether the possibility that the UE misses the MCCH modification notification needs to be addressed or whether it can be left to the UE implementation needs further consideration.

At least if RAN1 determines to utilize an RNTI other than an MCCH-RNTI for the MCCH modification notification, the MCCH modification notification is transmitted in the first MCCH monitoring occasion of each MCCH repetition period.

A single MCCH is supported.

Supplementary Note 1 provides details of the aspects of the control plane of delivery mode 2, taking the baseline of the LTE eMBMS mechanism into account.

2. Discussion

3. Remaining Problems of Stage 2

At this point, features of the two delivery modes are described in Table 17 in accordance with the agreement of RAN2.

4. Multicast Session Connected via Delivery Mode 2

The NR MBS is expected to support various types of use cases as quoted in the following WID. The NR MBS needs to be appropriately designed for a variety of requirements ranging from delay-sensitive applications such as mission critical and V2X to delay-tolerant applications such as IoT. As software delivery to UDP type streaming such as IPTV, actually not all multicast services require "high QoS".

An object A of the SA2 SI relates to activation of general MBS services via 5GS, and use cases that are recognized to be likely to benefit from this function include public safety, mission critical cases, V2X applications, transparent IPv4/IPv6 multicast delivery, IPTV, and software delivery via wireless communications, group communications, and IoT applications.

Although some of these services with "low QoS requirements" may be covered by delivery mode 2, other services with "high QoS requirements" need delivery mode 1. The LTE eMBMS may deliver a multicast session, which may be considered a baseline for the NR MBS. In this sense, selection of use of delivery mode 2 for multicast sessions is advantageous to the gNB. Although this problem needs to be further considered from RAN2 #112-*e* to RAN2 #114-*c*, in general there seems to be no technical reason to restrict them.

Although RAN2 has agreed on that "RAN2 agreed that active multicast support in the RRC connected mode of Rel-17 is preferred, and if time is allowed, multicast support in RRC inactive state can be discussed later (multicast solution in connected mode and broadcast solution more mature)", since the agreement was made in the context of delivery mode 1, it does not exclude a multicast session in delivery mode 2 of UE in a connected state.

Proposal 1: RAN2 needs to agree that delivery mode 2 can be used at least in multicast sessions of the UE in the RRC connected state in addition to broadcast sessions.

5. Dedicated MCCH (from the Viewpoint of Service Continuity)

The RAN2 has agreed that "the discussion on whether a dedicated MCCH configuration is needed is delayed until RAN1 develops in the BWP/CFR of the MCCH". The dedicated MCCH is expected to be provided through, for example, an RRC reconfiguration if supported.

Observation 1: A dedicated MCCH is provided by a RRC reconfiguration of an MCCH. That is, it can be interpreted that the method is not a broadcast-based method.

On the other hand, the dedicated MCCH can be considered from the viewpoint of continuity of the broadcast service. RAN2 has already agreed that "the PTM configuration of NR MBS delivery mode 2, i.e., the broadcast-based method, is assumed to be able to be received by reusing the LTE SC-PTM mechanism of the UE in the connected state is assumed". Although this assumption relates to an intra-cell configuration, it is not related to continuity of inter-cell services, i.e., handover.

Observation 2: Although the MCCH that RAN2 has agreed is provided in a broadcast-based method for the intra-cell configuration, it is not for continuity of inter-cell services.

In LTE SC-PTM, the UE is assumed to acquire the SIB20 and MCCH of a target cell in some way before, during, or even after a handover. This may be regarded as the baseline of NR MBS delivery mode 2. However, this means that there is a risk of service interruption because the UE may miss or delay acquiring the MCCH of a neighboring cell, for example, in a busy state. Therefore, it is worth discussing more reliable solutions. Specifically, the MCCH of the target cell, at least the target MTCH scheduling information, needs to be provided by an RRC reconfiguration using synchronization, i.e., a handover command. This solution can reliably ensure service continuity after a handover.

Proposal 2: RAN2 needs to agree that the MCCH of a target cell, at least target MTCH scheduling information, is to be provided during the handover procedure. That is, it is provided by a RRC reconfiguration using synchronization to ensure continuity of inter-cell services for a UE in the RRC connected state.

6. MCCH Modification Notification Related to Other Information

RAN2 agrees to introduce an MCCH modification notification by session start, session change and stop, to currently intend that the MCCH modification notification is transmitted when the configuration related to MTCH reception (e.g., MBS session information and MTCH scheduling information) is modified. RAN2 commented "whether this notification can be reused to modify other information carried by the MCCH needs to be further considered".

Possible "other information" can be interpreted as neighboring cell/frequency information, which will be discussed in the following section. If the UE misses a neighboring cell/frequency information, this is not a significant problem when the UE remains in the serving cell. However, the latest neighboring cell/frequency information is important information in case of inter-cell mobility of UEs in the idle/inactive state and UEs in the RRC connected state if proposal 5 is not agreed on. In this sense, for more reliable service continuity, if RAN2 agreed that the neighboring cell/frequency information is provided by the MCCH, the MCCH modification notification also needs to be transmitted even when other information is modified.

Proposal 3: RAN2 needs to agree that the MCCH modification notification is transmitted when any of the content of the MCCH is modified. That is, in addition to MBS session information and MTCH scheduling information, it is also applied to "other information" which is at least adjacent frequency/cell information (if it is agreed to be provided by MCCH).

7. Missed MCCH Modification Notification

RAN2 commented "whether the UE needs to address the possibility of missing the MCCH modification notification or whether it can be left to the UE implementation needs further consideration". According to the agreement, the MCCH modification notification is expected to be provided in the DCI, but the details are up to RAN1.

What needs for further consideration relates not only to session modification/termination, but also to session initiation, which has not been recognized as a problem in LTE eMBMS. Whether the problem actually exists may depend on the DCI design of RAN1. For example, an MCCH modification notification may be transmitted even when the MCCH has not been modified. For example, a bit in DCI can be "0" to indicate "no modification" and "1" to indicate "modified", and thus the UE can be notified of whether an MCCH modification has been missed. The notification may be given without additional power consumption and some actions for recovery can be performed. Therefore, whether RAN2 needs to discuss the need for further consideration at this time is unclear.

Observation 3: Before RAN2 discusses the possibility of the UE missing the MCCH modification notification, RAN1 progress status in the DCI design of the MCCH modification notification is required.

8. On-Demand MCCH

A new paradigm of NR supports on-demand SI transmission. This concept may be reused for the MCCH in delivery mode 2, i.e., on-demand MCCH. For example, the MCCH for delay-tolerant services is provided on demand, thus enabling optimization of resource consumption by signalling. Of course, the network includes another option for providing the MCCH periodically, rather than on-demand of delay-sensitive services, and the like.

Proposal 4: RAN2 needs to agree that an MCCH can be provided on demand.

9. One-Step Configuration

As another possibility, merging an MCCH with a BCCH, i.e., one-step configuration as illustrated in FIG. 18, may be studied further. For example, the SIB provides MTCH scheduling information directly, i.e., without the MCCH. Delay-tolerant services and optimization of power-sensitive UEs are provided. For example, the UE can request the SIB (on-demand), and the gNB can start providing the SIB and the corresponding service after requests from the plurality of UEs. These UEs do not need to monitor the repeatedly broadcast MCCH.

Proposal 5: RAN2 needs to agree on that multicast reception without the MCCH is supported (i.e., one-step configuration). For example, the SIB provides MTCH scheduling information directly.

10. Counting in Idle/Inactive State

For the NR MBS, although the support for the MBS interest indication in the RRC connected state has been agreed, the MBS interest indication in the idle/inactive state is not supported. Based on this, it is worthwhile to study function enhancement, in addition to the LTE eMBMS.

In the LTE eMBMS, even when most of the UEs receive broadcast services in the RRC idle state, information of neither the MII nor count can be collected from the UEs in the idle state. This is one remaining problem of the LTE eMBMS from the viewpoint of session control and resource efficiency.

Observation 4: For a broadcast session, most UEs receiving the MBS service may be in the RRC idle/inactive state.

In the NR MBS, the same problem may occur in the UE in the idle/inactive state, i.e., in delivery mode 2 of broadcast sessions. For example, the network does not recognize whether the UE in the idle/inactive state is not receiving/interested in broadcast services. Thus, the network may continue to provide PTM transmission even when no UEs are receiving services. When the gNB recognizes benefits of the UE in the idle/inactive state, such unnecessary PTM transmission needs to be avoided. Conversely, when the PTM stops while the UE in the idle/inactive state receiving services are still present, many UEs may transmit connection requests simultaneously, which is also undesirable.

Accordingly, it is worthwhile to study whether to introduce a mechanism for collecting UE assistance information, specifically the MBMS count, from the UE in the idle/inactive state. Needless to say, that the UEs in the idle/inactive state is capable of reporting information without transitioning to the RRC connected state is desirable. For example, this may be achieved when the PRACH resource partitioning associated with the MBS service is introduced to such a report.

It is be noted that NR MBS does not have MCE, and this means that the MCE function is integrated in the gNB. In this sense, RAN2 determines whether the count is required in the NR MBS, regardless of what RAN3 has determined from the viewpoint of the network interface.

Proposal 6: RAN2 needs to discuss whether the MBS count is to be introduced and also collected from the UE in the idle/inactive state.

11. Aspect of Stage 3

A cell reselection procedure in SIB13, SIB15, SIB20, SC-MCCH, MBMS interest indication IE, and LTE can be regarded as the baseline of the stage 3 specifications of the NR MBS.

12. MBS-Specific SIB

13. Basic Content

RAN2 has agreed that "MBS-specific SIBs are defined to perform an MCCH configuration". Regarding the MCCH configuration, RAN2 has already agreed that "an MCCH transmission window is defined by an MCCH repetition period, an MCCH window period, and a radio frame/slot offset" and "a modification period is defined for an NR MCCH". These parameters are the same as those of the SIB20 and they are, i.e., an SC-MCCH-repetition period, an SC-MCCH-first subframe, an SC-MCCH-period, an SC-MCCH-offset, and an SC-MCCH-modification period, respectively. The ranges of these parameters can be easily reused to minimize standardization efforts.

Proposal 7: RAN2 needs to agree that, in the MBS-specific SIB, the ranges of MCCH repetition period, period, radio frame/offset, and modification period reuse the range of these parameters of the LTE SC-PTM, i.e., SIB20.

14. Advanced Content

Whether the MBS service is provided in PTP or PTM and whether it is provided in delivery mode 1 or delivery mode 2 depends on the implementation of a NW. This provides a good balance between service reliability and spectral efficiency. However, from the viewpoint of a UE, especially for a UE in the idle/inactive state and a UE joining late, the UEs need to know whether it needs to start connection establishment to acquire a target MBS service. The UEs check the MCCH first, and if the MCCH does not contain MTCH scheduling information of the target MBS service, the UEs may consider to be aware of the fact that the MBS service is only provided in the RRC connected state, i.e., via PTP, delivery mode 1 or unicast (PDU session). However, such a process is a burden for the UEs and may cause some degree of delay before acquiring the MBS service. Therefore, it is worth discussing whether the MBS-specific SIB provides information on whether the UEs need to be connected to acquire the MBS service.

Proposal 8: RAN2 needs to discuss whether the MBS-specific SIB provides information for associating MBS services with their delivery modes.

RAN2 has agreed to introduce MBS interest indications that are assumed to be used in broadcast sessions. At least from the viewpoint of AS, it is up to the network whether the MBS service is provided as a multicast session or a broadcast session. Furthermore, from the viewpoint of the UE, whether the gNB can acquire information about the MBS service that the UE is interested in is unclear, which may be provided by the AMF for multicast sessions, but not for broadcast sessions. As a result, the UE cannot know whether the MBS interest indications need to be transmitted for the MBS service of interest. Therefore, it is useful for the UE if the gNB provides information about whether the MBS interest indications are allowed for each MBS service. In other words, which MBS service needs the MBS interest indication is the key. Therefore, RAN2 needs to discuss whether such additional information is needed. Proposal 9: RAN2 needs to discuss whether the MBS-specific SIB provides information about whether the MBS interest indication can be transmitted to each MBS service.

15. MCCH

RAN2 "has agreed on the fact that the content of an MCCH needs to include information about a broadcast session such as a G-RNTI and an MBS session ID, and schedule information of an MTCH (search space, DRX, and the like). An L1 parameter that needs to be included in the MCCH are pending progress and input of RAN1", and "discussion of whether a dedicated MCCH configuration is needed is postponed until RAN1 progresses in the BWP/CFR of the MCCH".

For the MTCH scheduling information, the SC-MCCH of the LTE SC-PTM includes SC-MTCH-InfoList including MBMS Session Info (TMGI and session ID), g-RNTI, and SC-MTCH-scheduling Info (On Duration Timer SCPTM, DRX-Inactivity Timer SCPTM, Scheduling Period Start Offset SCPTM). Since RAN2 has agreed that "in the case of NR MBS delivery mode 2, the LTE SC-PTM DRX scheme is used as the baseline", these parameters and value ranges are simply reused to minimize standardization efforts.

Proposal 10: RAN2 needs to agree that the MCCH provides MBS Session Info (TMGI and session ID), G-RNTI and MTCH-scheduling Info (On Duration Timer, Inactivity Timer, Scheduling Period and Start Offset) as MTCH information.

Proposal 11: RAN2 needs to agree that a value range of each parameter of the MTCH scheduling information (that is, On Duration Timer, Inactivity Timer, Scheduling Period, and Start Offset) is the same as those parameters of the LTE SC-PTM, that is, the SC-PTM configuration.

In LTE eMBMS, SIB15 provides inter-frequency information in SAI, that is, an MBMS-SAI-inter-frequency list. In LTE SC-PTM, the SC-MCCH includes an SCPTM-neighboring cell list including a cell ID and a frequency and an SC-MTCH neighboring cell list which is a bit string for referring to the neighboring cell list. These pieces of information are useful for service continuity, i.e., MBMS interest indications and cell reselection priority processing, from the viewpoint of the UE.

Such neighboring cell/frequency information is regarded as being continuously useful in NR MBS for the same purpose, i.e., service continuity. Therefore, RAN2 needs to agree on the cell/frequency list on which the MBS service is broadcast. Since the UE needs to know the cell/frequency on which the target MBS service is provided, the neighboring cell/frequency information needs to be associated with the MBS session ID (such as TMGI). For example, the cell/frequency list further associated with SAI such as an LTE eMBMS needs further consideration, and whether it is broadcast via an MBS-specific SIB or MCCH also needs further consideration.

Proposal 12: RAN2 needs to agree that the neighboring cell/frequency list associated with the MBS session ID (such as TMGI) is broadcast for service continuity. Whether it is further associated with SAI and whether it is provided on an MBS-specific SIB or MCCH needs further consideration.

16. MBS Interest Indication

17. Basic Content

Although RAN2 has agreed to "assume that an MBS interest indication is supported by UEs in a connected mode of a broadcast service", the exact content has not yet been discussed.

In LTE, an MBMS interest indication includes three IEs except for a ROM-related configuration (as shown in FIG. 19). This assistance information helps to ensure service continuity, such as scheduling of the gNB and decision on handovers. Since the characteristics of SC-PTM and delivery mode 2 are very similar, the same information is regarded as useful for NR MBS.

Proposal 13: RAN2 needs to agree that the MBS interest indication includes a list of frequencies, priorities between MBS reception and unicast, and a list of MBS services, similar to the MBMS interest indication of LTE.

Since the minimum MBS service area may be a cell of the NR MBS, whether the MBS interest indication also needs to include a list of cells providing MBS services in which the UE is interested is considered. In LTE SC-PTM, since the gNB provides neighboring cell information, assuming that the gNB knows which neighboring cell provides which MBS service, MBMS service means such a cell. The same assumption applies to NR MBS, especially if proposal 9 can be agreed upon. Therefore, RAN2 needs to verify the gNB.

Proposal 14: If the MBS service list is included in the MBS interest indication, RAN2 needs to confirm that it means the cell providing the MBS service in which the UE is interested, that is, that the gNB knows the MBS service to be provided by the neighboring cell is assumed.

18. Advanced Content

In addition to the LTE baseline, i.e., the above proposals 13 and 14, it is worth considering whether the MBS interest indication needs to provide other assistance information.

For example, the MBMS priority may be used to indicate whether the UE prefers MBMS reception to unicast reception, which may be helpful for scheduling gNB and may be reused in NR MBS, for example. However, there are two delivery modes for NR MBS, that is, delivery mode 1 using C-RNTI and delivery mode 2 using G-RNTI, which are based on different scheduling algorithms for MTCH transmission. Thus, if a UE is interested in multiple MBS services provided via different delivery modes, it may be helpful for the UE to provide priority between reception in delivery mode 1 and reception in delivery mode 2. Other examples may also be considered, such as the power saving configuration of the UE described as needed. Therefore, RAN2 first needs to discuss whether additional information for advanced purposes is provided by the MBS interest indication.

Proposal 15: RAN2 needs to discuss whether additional information is provided by an MBS interest indication, for example, priorities between reception in delivery mode 1 and reception in delivery mode 2.

19. Definition of Message

Another issue worth considering is whether an MBS interest indication is a new/separate message or integrated with a UE assistance information message. In LTE, MBMS interest indications (MIIs) are separated from the UE assistance information (UAI) due to preconditions being different, i.e., to obtain SIB15 of the MIIs during RRC connection reconfiguration of UAI. On the other hand, the In-device-CoexistenceIndication (IDC), which is a separate message in LTE, is integrated into UAI of NR. Since the preconditions for LTE (and NR) were the same between IDC and UAI, i.e., the RRC connection reconfiguration is the same, they are feasible.

Observation 5: Whether the MBS interest indication can be integrated with the UE assistance information depends on whether the preconditions are coordinated between two messages.

In the case of NR MBS, neighboring cell/frequency information of an MBS-specific SIB or MCCH as in Proposal 9 is needed to generate an MBS interest indication message in the IE of Proposal 10. That the MBS interest indication is configured in an MBS-specific SIB, the same SIB (or MCCH) as in the case of LTE eMBMS is expected. Therefore, it is not consistent with the precondition of UAI, i.e., an RRC reconfiguration. Therefore, the MBS interest indication needs to be a separate message from the UAI, like the LTE eMBMS.

Proposal 16: RAN2 needs to agree to define the MBS interest indication as a new message, i.e., separately from the UE assistance information.

Proposal 17: RAN2 needs to agree that transmission of the MBS interest indication is allowed if the UE can acquire the MBS-specific SIB from a serving cell (i.e., as a precondition).

20. MBS Interest Indication of Multicast Session

RAN2 assumes that MBS interest indications are supported in broadcast sessions but are not supported in multicast sessions. In the case of a multicast session, it is generally understood that the core network informs the gNB of the interest of the UE because the multicast session has an upper layer session join procedure. In the context of Proposal 10 and FIG. 18, it applies to the MBS services of interest of the UE. If Proposal 11 can be agreed on, that the gNB knows the MBS frequency and the cell providing the MBS service of interest of the UE is clear. However, because the priority between MBS reception and unicast is similar to the priority of LTE MBMS, it is purely AS-related information, i.e., it is strange for the UE to notify the core network of the priority information in the session join procedure, they may not be provided by the core network.

Observation 6: For a multicast session, the core network provides a gNB of interest of the UE, such as an MBS service, and the gNB knows the MBS frequency/cell, but the core network and the gNB may not know the AS priority of the UE between MBS and unicast.

The priority information is still regarded as useful for the gNB, e.g., for scheduling and handover decisions as well as for LTE eMBMS, which is also related to service continuity. Therefore, the UE needs to inform the gNB of the priority information also for multicast sessions. In this sense, RAN2 needs to agree that the multicast service/delivery mode 1 also needs to support MBS interest indications.

Proposal 18: RAN2 needs to agree that the MBS interest indication is also supported in multicast session delivery mode 1, at least for the UE to inform the gNB of the priority between MBS reception and unicast.

21. Cell Reselection

22. Priority Processing of Cell Reselection

In LTE eMBMS, for inter-frequency cell reselection, a so-called "highest priority rule" is applied to priority processing of cell reselection. In particular, the UE may regard the frequency for providing the MBMS service of interest as the highest priority. The UE can regard a frequency at which an MBMS service of interest is not provided as the lowest priority. Regardless of the absolute frequency priority configured by the eNB, the UE can reselect the cell providing a target MBMS service, thus ensuring service continuity. These rules apply only at the frequency level, and that the MBMS service is provided for each frequency can be sufficiently assumed.

Observation 7: In LTE, service continuity is guaranteed by a UE that can regard the frequency for providing the target MBMS service as highest priority, which can be applied to inter-frequency cell reselection.

Observation 8: In LTE, the UE can also regard the frequency for not providing a target MBMS service as the lowest priority, which can be applied to inter-frequency cell reselection.

Furthermore, for intra-frequency and inter-frequency cell reselection having equal-priority, NB-IOT of CE, and UE (i.e., enhanced coverage), the R criterion (i.e., ranking) applies a SC-PTM specific offset, which can be configured to be "infinity". This mimics the "highest priority rule" for each cell. This means that "the UE is in enhanced coverage because the defined ranking applies to intra-frequency and inter-frequency cell reselection (regardless of the configured frequency priority)", i.e., inter-frequency cell reselection of the past cannot be applied to NB-IOT of CE and UE.

Observation 9: In LTE, a UE of NB-IOT and a UE of CE apply a SC-PTM specific offset (which may be "infinity") to the R criterion. This can be applied to intra-frequency and inter-frequency cell reselection at the same priority.

In summary, there are two mechanisms in LTE that can be applied to inter-frequency cell reselection (i.e., frequency-based) and intra-frequency and inter-frequency reselection at an equal priority (i.e., cell-based), respectively. The "highest priority rule" for inter-frequency cell reselection is simple to introduce in NR MBS because, similar to LTE eMBMS, UEs in idle/inactive states need to camp on the frequency providing the target MBS service. Therefore, RAN2 needs to agree on introducing the "highest priority rule" for the NR MBS. The "lowest priority rule" as in Observation 5 needs to be introduced.

Proposal 19: RAN2 needs to agree that, similar to LTE, the frequencies at which the UE provides the target MBS service may be regarded as having the highest priority.

Proposal 20: RAN2 needs to agree that, similar to LTE, the frequencies at which the UE does not provide the target MBS service may be regarded as having the lowest priority.

23. R Criterion

Another mechanism, that is, the SC-PTM specific offset of the R criterion, is worth taking into account that the minimum service area of the NR MBS is regarded as a cell, but still depends on the development scenario preferred in Rel-17, i.e., a frequency-based or cell-based one. Frequency-based development, i.e., provision of the same MBS service between cells at frequencies within a particular MBS service area, is a subset of cell-based development. That is, since the MBS service can represent a frequency on a list of cells, the MBS service is provided only in a cell, so that the list includes all cells on the frequency. Thus, if MBS services are provided basically for each cell, flexibility for supporting different development scenarios increases.

As described above, the SC-PTM specific offset was introduced for multicast support in eMTC/NB-IOT in Rel-14, i.e., no inter-frequency cell reselection in CE, but can be used to prioritize specific cells. An MBMS service of interest is provided. Therefore, the same mechanism can be reused to prioritize the cell providing the MBS service of interest of the UE, thereby reducing standardization efforts.

Proposal 21: RAN2 needs to agree that an MBS-specific offset can be applied to the R criterion in order to prioritize a specific cell providing the MBS service of interest of the UE, and thus the offset can be set to "infinity", similar to LTE.

[APPENDIX] SIB13 OF LTE

The content of SIB13 of LTE is shown in FIGS. 20 to 22.

SIB15 of LTE

The content of SIB15 of LTE is shown in FIG. 23.

SIB20 of LTE

The content of SIB20 of LTE is shown in FIG. 24.

SC-MCCH of LTE

The content of SC-MCCH of LTE is shown in FIGS. 25 to 27.

MBMS Interest Indication in LTE

The content of the MBMS interest indication in LTE is shown in FIGS. 28 to 30.

Cell Reselection Priority Processing in LTE

Cell reselection priority for eMBMS frequencies in LTE is shown in FIG. 31.

Cell-Level Prioritization in LTE

Cell-level prioritization in intra-frequency and intra-frequency cell reselection at equal priority in NB-IOT in CE (including eMTC) and a UE in LTE are shown in FIG. 32.

An example in which QoffsetSCPTM is set as an SCPTM frequency offset in SIB5 is shown in FIG. 33.

Supplementary Note 2

1. Introduction

RAN #88 has approved revised work items that are related to the NR multicast and broadcast service (MBS). With respect to the aspect of group scheduling, RAN2 #114 has reached the following agreement.

One-to-one mapping between G-RNTIs and MBS sessions is supported in the NR MBS. Other type of mapping needs to be considered.

One-to-one mapping between G-CS-RNTIs and MBS sessions is supported in the NR MBS.

Other type of mapping needs to be considered.

A UE can support multiple G-RNTIs/G-CS-RNTIs. Whether this depends on the capabilities of the UE needs further consideration. RAN1 is notified of this agreement.

Multiple MBS QoS flows corresponding to the same MBS session may be mapped to one or more MBS radio bearers.

The MCCH is mapped to the DL-SCH of NR MBS delivery mode 2.

The MTCH is defined for PTM transmission of the NR MBS.

The MTCH is mapped to the DL-SCH.

A DTCH is reused for PTP transmission of the NR MBS.

Whether a particular LCID space is required for the channel to be used needs further consideration.

Multiplexing/demultiplexing of different logical channels associated with the same G-RNTI is supported in the NR MBS.

Whether multiplexing/demultiplexing of different logical channels associated with the same G-CS-RNTI is supported in the NR MBS needs further consideration.

Multiplexing/demultiplexing of various logical channels associated with a C-RNTI is supported in the NR MBS.

In Supplementary Note 2, unresolved issues recognized in group scheduling are discussed. It is to be noted that those unresolved issues are considered as common issues for delivery mode 1 and delivery mode 2. Thus, the observations and proposals are applied to both delivery modes unless otherwise specified.

2. Discussion

3. Mapping between G-RNTI/G-CS-RNTI and MBS Session

Although RAN2 has agreed on one-to-one mapping between a G-RNTI and an MBS session and between a G-CS-RNTI and an MBS session, whether other mappings is supported needs further consideration.

The advantage of one-to-one mapping employed in LTE SC-PTM, which is the simplest scheme and is widely reused as the baseline of the NR MBS, is to avoid unnecessary power consumption of the UE caused when the UE tries to receive an uninterested MBS session. For example, a UE that is only interested in TMGI #1 needs to monitor only a G-RNTI #1. In other words, the UE does not try to decode the PDSCH allocated by the PDCCH scrambled with another G-RNTI.

Observation 1: One-to-one mapping of a G-RNTI/G-CS-RNTI to an MBS session is advantageous in terms of power consumption and simplicity of the UE.

For one-to-N mapping, one G-RNTI/G-CS-RNTI may be multiplexed with multiple MBS sessions. For example, G-RNTI #1 carries TMGI #1 and TMGI #2. Flexibility is obtained from the viewpoint of a NW because some MBS sessions requiring similar QoS may be transmitted with one G-RNTI. It has also been pointed out that one-to-N mapping may reduce complexities of a UE when the UE is interested to receive multiple MBS sessions simultaneously. However, whether such optimization is really necessary is not clear. Since RAN2 has already stated that "the UE can support multiple G-RNTIs/G-CS-RNTIs. Whether this depends on the functions of the UE needs further consideration", a UE that needs to receive multiple MCPTT sessions or the like simultaneously only supports such functions (if defined). One-to-N mapping is inefficient for retransmissions, for example, and if only one TMGI receives a NACK and the other TMGI receives an ACK, the entire transport block needs to be retransmitted.

On the other hand, a UE that is interested only in TMGI #1 still needs to receive data from TMGI #2, which is not optimal from the viewpoint of power consumption of the UE. That is, decoding a larger PDSCH than expected is necessary.

Observation 2: One-to-N mapping of a G-RNTI/G-CS-RNTI to MBS sessions may provide flexibility in limited cases from the viewpoint of the NW but is not optimal from the viewpoint of power consumption of the UE.

For N-to-one mapping, multiple G-RNTIs/G-CS-RNTIs carry one MBS session. For example, it can be thought that TMGI #1 is divided into G-RNTI #1 and G-RNTI #2. RAN2 has agreed that "multiple MBS QOS flows corresponding to the same MBS session can be mapped to one or more MBS radio bearers". It may be assumed that these QoS flows need different QoS, for example, one QoS flow for video streaming and another QoS flow for text transfer within the same MBS session. Therefore, it makes sense that these QoS flows are transmitted with, for example, different G-RNTIs having different periodicities and different amounts of resources. Since the UE only needs to monitor the G-RNTI associated with a target MBS session (and QoS flow), it cannot be expected that the power consumption of the UE will increase significantly.

Note: In one-to-one mapping as in Observation 10, all QoS flows corresponding to the same MBS session and mapped to multiple MRBs need to be mapped to the same G-RNTI even if the QoS requirements of these QoS flows are different. Although one-to-one mapping is efficient in most cases, it may not be the same in all cases.

Observation 3: N-to-one mapping of G-RNTIs/G-CS-RNTIs to an MBS session may be efficient for various QoS flows having various QoS requirements and may less affect impact on power consumption of the UE.

In view of the above observations, while N-to-one mapping is worth supporting, one-to-N mapping may be less advantageous. Therefore, RAN2 needs to discuss whether it needs to support N-to-one mapping in addition to one-to-one mapping.

Proposal 1: RAN2 needs to discuss whether N-to-one mapping of G-RNTIs/G-CS-RNTIs to an MBS session is additionally supported.

FIG. 9 illustrates the functionality of a UE of multiple G-RNTIs/G-CS-RNTIs.

4. UE Capability for Multiple G-RNTIs/G-CS-RNTIs

Although RAN2 has agreed that "a UE can support multiple G-RNTIs/G-CS-RNTIs", but "whether this depends on the functionality of the UE needs further consideration".

In LTE SC-PTM, the UE functionality scptm-ParallelReception-r13 is defined as shown in FIG. 34.

In the case of the NR MBS, similar UE functionality can be used as a baseline, but there are still many unresolved issues and NR-specific enhancements to be discussed, such as the use of BWP/Common Frequency Resource (CFR). Therefore, discussing aspects of the UE functionality at this time is too early.

Observation 4: The UE functionality will be discussed after the functionality is hardened.

5. LCID and LCID Space of MCCH and MTCH)

RAN2 has stated that "whether a particular LCID space is required for the channel to be used needs further consideration". In LTE eMBMS, separate LCID spaces are provided for the MCCH ("00000") and MTCH ("00001-11100", and in some cases "00000") of the MCH and the SC-MCCH and SC-MTCH ("11001") of the DL-SCH. Since eMBMS does not support the PDCP layer and only the RLC-UM mode is applied, these are feasible.

In LTE MBSFN, if there is no MCCH in the MCH, the MCCH and the MTCH can share the same LCID (i.e., "00000"), but different MTCHs are allocated to different LCIDs ("00001-11100"). Since "the MTCH and MCCH can be multiplexed in the same MCH" and "multiple MBMS services can be mapped to the same MCH", that is, one-to-N mapping is performed as in Observation 11, different LCIDs are required to distinguish MCCH from different MTCHs.

Of course, since the MCCH/MTCH is mapped to the MCH and the DTCH is mapped to the DL-SCH, the LCID space of the MCCH/MTCH is separated from the LCID space in unicast. It is useful to avoid that the LCID of MBSFN (i.e., MBMS area-specific and common to a group of UEs) collides with the same LCID in unicast (i.e., cell-specific and UE-specific).

Observation 5: In LTE MBSFN, there is a different LCID for each MTCH (up to 32 for one-to-N mapping), the LCID for MCCH may not be shared by MTCHs except for the case where there is no MCCH in the MCH, and the LCID space for MCCH/MTCH is separated from one in the case of a DTCH.

In LTE SC-PTM, the same LCID ("11001") is shared by an SC-MCCH, an SC-MTCH, and multiple SC-MTCHs. Since the SC-MCCH is transmitted on an SC-RNTI and "the transmission of the SC-MCCH and SC-MTCH is indicated by a logical channel-specific RNTI on the PDCCH (there is one-to-one mapping between the TMGI and the G-RNTI used for reception of the DL-SCH to which the SC-MTCH is mapped)", no different LCID is needed to distinguish the SC-MCCH from the different SC-MTCH. That is, the UE can distinguish these LCHs with the RNTI. Similar to MBSFN, by default, an individual LCID space functions to avoid an LCID collision between SC-PTM and unicast.

Observation 6: In LTESC-PTM, all MTCHs and MCCHs share the same LCID (due to one-to-one mapping and a logical channel specific RNTI), and the LCID (space) is separated from the LCID space of the DTCH.

In the case of the NR MBS, similar to LTE SC-PTM, the MCCH can be distinguished with the RNTI since RAN2 has agreed that "a new RNTI is defined for scheduling of the MCCH". The same is true for the MTCH. That is, the MTCH can be generally distinguished from other logical channels by the G-RNTI.

Observation 7: In the case of the NR MBS, the LCIDs for the MCCH and the MTCH can be shared with other logical channels because the UE can distinguish these logical channels by either the agreed new RNTI for the MCCH or the G-RNTI of the MTCH regardless of the LCID.

On the other hand, in the case of the MTCH, RAN2 has agreed that "multiple MBS QoS flows corresponding to the same MBS session can be mapped to one or more MBS radio bearers". Thus, it can be simply assumed that each MRB is associated with an individual LCH, as shown in FIG. 9. Therefore, even if one-to-one mapping between a G-RNTI/G-CS-RNTI and an MBS session is adopted, the UE cannot distinguish each MTCH belonging to the same MBS session. That is, the same G-RNTI/G-CS-RNTI can carry multiple MTCHs associated with the same MBS session. Therefore, the concept of one LCID shared by multiple MTCHs as in the LTE SC-PTM is not applicable to the NR MBS, and multiple LCIDs are required for the MTCH as in the LTE MBSFN.

Observation 8: In the case of the NR MBS, one LCID cannot be shared by multiple MTCHs. That is, even if one-to-one mapping between a G-RNTI/G-CS-RNTI and an MBS session is assumed, there may be multiple MRBs/MTCHs belonging to the same MBS session, so multiple LCIDs are required.

Meanwhile, the method of defining the LCID of the MTCH is also related to whether to maintain the principle of one-to-one mapping between a G-RNTI/G-CS-RNTI and an MBS session. Using one-to-one mapping, the UE can ascertain each MBS session from the corresponding G-RNTI. Therefore, since the LCIDs can be grouped for each MBS session (or G-RNTI), the number of LCIDs is equal to the number of MTCHs belonging to the same MBS session. For example, there are three LCIDs regardless of the number of MBS sessions as illustrated in FIG. 10. Using N-to-one mapping, the UE can ascertain each MBS session from the corresponding G-RNTI. Therefore, the number of LCIDs is equal to the number of MTCHs mapped to the same G-RNTI. For example, there are a maximum of two LCIDs regardless of the number of MBS sessions as illustrated in FIG. 10. If one-to-N mapping is allowed, the UE cannot distinguish each MBS session from a G-RNTI. Therefore, the number of LCIDs is the same as the number of MTCHs of all MBS sessions. Thus, more LCIDs may be needed for one-to-N mapping, compared to one-to-one or N-to-one mapping.

Observation 9: In the case of the NR MBS, the number of LCIDs of MTCHs is related to the mapping rule (one-to-one, N-to-one, or one-to-N) for G-RNTIs/G-CS-RNTIs to MBS sessions.

Observation 10: In the case of the NR MBS, the mapping rules for one-to-one and N-to-one may result in a lower number of LCIDs for the MTCH, compared to one-to-N mapping.

In light of the above observations, different LCIDs need to be allocated to each MTCH. This means that the maximum number of LCIDs of the MTCHs is defined. At this point, according to the aforementioned LTE MBSFN, although such a maximum number may be regarded as 32, a smaller number may be desirable.

Proposal 2: RAN2 needs to discuss the maximum number of LCIDs of MTCHs. For example, a possible baseline is less than 32 LCIDs based on LTE MBSFN.

In the context of the above observations, RAN2 needs to agree that the MCCH and MTCH may share the same LCID to avoid unnecessarily consumption of LCIDs.

Proposal 3: RAN2 needs to agree that the MCCH and the MTCH may share the same LCID. That is, the UE distinguishes the MCCH by using the agreed new RNTI and distinguishes the MTCH by using the G-RNTI, and each MTCH is distinguished by using the corresponding LCID.

The remaining issue is then whether to make the LCID space of the MBS common with or separate from the LCID space of unicast. Assuming 32 LCIDs as in Proposal 2, an eLCID may be allowed to consume such code points dedicated to an MBS due to the large space of the eLCID. That is, the amount of code points consumed is 256 in one octet eLCID mainly in the case of MAC CE, and 65536 in two octets eLCID mainly in the case of DTCH. However, preparing such a separate LCID space is questionable because actual advantages are unknown. From the viewpoint of MAC of the UE, after receiving and demultiplexing MAC PDUs, each MAC SDU is transmitted to the corresponding RLC entity. That is, operations of the UE are the same regardless of whether these MAC SDUs are associated with any of an MCCH, an MTCH, or a DTCH. If a set of LCIDs (e.g., 32) is reserved for the MBS by default regardless of whether the MBS service is being provided, the use of LCIDs is inefficient (i.e., an MCCH/MTCH is transmitted in a cell).

Observation 11: In the case of the NR MBS, the advantages of using individual LCID spaces for the MBS is not clear from the viewpoint of the UE.

The NR MBS supports only single cell transmission in Rel-17. That is, there is no standard support for a Single Frequency Network (SFN). Thus, depending on implementation, the gNB can fully manage LCIDs of the MCCH/MTCH (cell-specific and common to all UEs) and not conflict with the LCID of the DTCH (UE-specific).

Observation 12: In the case of the NR MBS, since the standard support is limited to single cell transmission of Rel-17, the NW implementation can manage the LCID of the MBS so that it may not conflict with the LCID of unicast without an individual LCID space.

On the other hand, from the viewpoint of future assurance, for example, for the possibility of standard support of SFN, an individual LCID space of the MBS is advantageous because the LCID of the MBS needs to be coordinated between multiple cells/gNBs. That is, the LCID is MBS area specific and common to all UEs, and there may be a risk of conflicting with the LCID (cell-specific and UE-specific) of the DTCH. Therefore, it needs to be discussed whether an individual LCID space is reserved for the MCCH/MTCH in this release only for future enhancement of the MBS.

Proposal 4: RAN2 needs to discuss whether the LCID spaces of the MCCH and the MTCH are different from the LCID space of the DTCH for future assurance (such as support for the single frequency network).

With respect to PTP transmission, RAN2 has agreed that "the DTCH is reused for PTP transmission in the NR MBS". Thus, the LCID for PTP transmission is thought as not being part of RAN2 for which further consideration has been recognized. In other words, sharing the same LCID space as that of unicast is very natural. However, it may be beneficial for RAN2 to confirm the intent of the agreement.

Proposal 5: RAN2 needs to confirm that the DTCH for PTP transmission shares the LCID space with the DTCH for unicast. That is, at least from the viewpoint of MAC, PTP transmission is the same as that in unicast of the past.

6. (De) Multiplexing of Different Logical Channels

RAN2 has agreed that "multiplexing/demultiplexing of different logical channels associated with the same G-RNTI is supported in the NR MBS" and "multiplexing/demultiplexing of different logical channels associated with a C-RNTI is supported in the NR MBS". RAN2 has stated that "whether multiplexing/demultiplexing of different logical channels associated with the same G-CS-RNTI is supported in the NR MBS needs further consideration".

Although further consideration is thought to be needed because different logical channels are (de)multiplexed by G-CS-RNTIs. RAN2 has already agreed on one G-RNTI. Like a G-RNTI, support for (de)multiplexing of different logical channels with the same G-CS-RNTI is not a problem.

Proposal 6: RAN2 needs to agree on support for (de) multiplexing of different logical channels associated with the same G-CS-RNTI, like a G-RNTI.

7. DRX for PTM Transmission

RAN2 has stated that "in the case of PTM transmission of the NR MBS, further consideration is needed regardless of whether the DRX scheme is independent from DRX of unicast transmission, and for example, the transmission is supported for each G-RNTI". In LTE SC-PTM, DRX of the SC-MTCH is independent from DRX of unicast. Of course, in LTE MBSFN, DRX of the MTCH (i.e., an MBSFN subframe) is independent from DRX of unicast.

In the NR MBS, the same principle applies because DRX of the MTCH is common to multiple UEs while DRX of unicast is UE-specific. Therefore, coordinating these DRXs is difficult and inefficient. Since RAN2 has already agreed that "multiplexing/demultiplexing of different logical channels associated with the same G-RNTI is supported in the NR MBS", DRX of the MTCH is configured for each G-RNTI. The UE wakes up in a PTM transmission opportunity (on-duration) to monitor the associated G-RNTI. Therefore, RAN2 needs to agree that the DRX configuration is provided for each G-RNTI independent from DRX of unicast.

Proposal 7: RAN2 needs to agree that DRX of PTM is independent from DRX of unicast and is configured for each G-RNTI.

8. DRX Parameters of Delivery Mode 1

MTCH reception in delivery mode 1 is basically performed by a UE in an RRC connected state, and supports dynamic scheduling, HARQ feedback/retransmission and the like, and thus its characteristics are similar to those of the DTCH, i.e., unicast. Therefore, it makes sense to reuse the DRX parameters of unicast, i.e., the DRX configuration.

Proposal 8: RAN2 needs to agree that the DRX parameters for PTM transmission via delivery mode 1 use one for unicast, i.e., the DRX configuration, as the baseline.

If RAN2 agrees on Proposal 8, it needs to discuss which parameter needs to be correctly introduced in PTM transmission via delivery mode 1. As shown in FIG. 35, since UL retransmission is not applicable to the NR MBS, parameters related to UL retransmission being unnecessary is clear. The parameters associated with short DRX are also not needed because short DRX may not be as efficient for MBS traffic. For example, since typical MBS traffic is assumed to be a type of audio and video, these transmission cycles may be stable and are compatible with long DRX. There is no option of short DRX in LTE SC-PTM as shown in FIG. 36. In other words, parameters related to long DRX and DL retransmission can be reused as they are.

Proposal 9: In addition to Proposal 8 (i.e., DRX of unicast as a baseline for PTM transmission via delivery mode 1), RAN2 needs to agree that parameters for UL retransmission and short DRX are not needed.

9. DRX Parameters of Delivery Mode 2

RAN2 has agreed that "in the delivery mode 2 in the NR MBS, the LTE SC-PTM DRX scheme is used as the baseline". DRX parameters for LTE SC-PTM are shown in FIG. 36. These are basically the same as those in FIG. 35/Proposal 30 (i.e., for PTM transmission via delivery mode 1) for parameters related to DL retransmission. If parameters for unnecessary DL retransmissions are excluded in delivery mode 2, the on-duration timer, inactivity timer, scheduling period, and start offset can be reused without significant problems.

Observation 13: The baseline of the DRX parameters for PTM transmission via delivery mode 2, i.e., the baseline based on the SC-MTCH scheduling information, can be ascertained.

10. DRX for PTP Transmission

RAN2 has stated that "for PTP transmission, whether to reuse the DRX operation of unicast transmission needs further consideration". On the other hand, RAN2 has already agreed that "multiplexing/demultiplexing of different logical channels associated with a C-RNTI is supported in the NR MBS". This is not limited to different logical channels belonging to the MBS service. That is, a case in which channels are (de)multiplexed with a unicast service may be considered. RAN2 has further agreed that "a DTCH is reused in PTP transmission in the NR MBS". This means that MAC does not need to know to which of a DRB or an MRB each MAC SDU for the DTCH belongs. That PTP transmission is performed by using the same C-RNTI as transmission in existing unicast is already apparent. In this sense, PTP transmission is exactly the same, at least from the viewpoint of the DRX operation, and is consistent with unicast transmission.

Proposal 10: RAN2 needs to agree that, in PTP reception, the UE only wakes up in on-duration of unicast. That is, there is neither additional on-duration nor specific enhancement in PTP transmission, at least from the viewpoint of DRX.

REFERENCE SIGNS

1 Mobile communication system
10 RAN
20 CN
100 UE
110 Receiver
120 Transmitter
130 Controller
200 gNB
210 Transmitter
220 Receiver
230 Controller
240 Backhaul communicator

The invention claimed is:

1. A communication method used by a user equipment configured to perform reception processing of a physical downlink control channel (PDCCH) from a base station by using a radio network temporary identifier (RNTI), the communication method comprising:

performing the reception processing to receive a dedicated traffic channel (DTCH) by using a cell RNTI (C-RNTI);

performing the reception processing to receive a multicast traffic channel (MTCH) by using a group RNTI (G-RNTI); and when a logical channel identifier (LCID) having a same value is allocated to the DTCH and the MTCH, specifying a logical channel where received data obtained in response to the reception processing belongs, based on the RNTI used in the reception processing.

2. The communication method according to claim 1, wherein when the LCID comprised in the received data is the LCID having the same value allocated to the DTCH and the MTCH, the specifying comprises specifying the DTCH as the logical channel where the received data obtained in response to the reception processing by using the C-RNTI belongs, and specifying the MTCH as the logical channel where the received data obtained in response to the reception processing by using the G-RNTI belongs.

3. The communication method according to claim 1, further comprising outputting, at a medium access control (MAC) layer of the user equipment, the received data to the specified logical channel.

4. The communication method according to claim 1, further comprising receiving, from the base station, information configured to associate a data radio bearer (DRB) and an LCID of the DTCH and information configured to associate a multicast radio bearer (MRB) and an LCID of the MTCH.

5. A non-transitory computer-readable medium comprising, stored thereupon, computer program instructions for execution by a user equipment, the program instructions being configured to cause a user equipment to carry out the communication method of claim 1.

6. A chipset comprising means for carrying out the communication method of claim 1.

7. A user equipment configured to perform reception processing of a physical downlink control channel (PDCCH) from a base station by using a radio network temporary identifier (RNTI), the user equipment comprising:

a receiver configured to perform the reception processing to receive a dedicated traffic channel (DTCH) by using a cell RNTI (C-RNTI); and the reception processing to receive a multicast traffic channel (MTCH) by using a group RNTI (G-RNTI); and a controller configured to when a logical channel identifier (LCID) having a same value is allocated to the DTCH and the MTCH, specify a logical channel where received data obtained in response to the reception processing belongs, based on the RNTI used in the reception processing.

* * * * *